US011301419B2

(12) United States Patent
Liu et al.

(10) Patent No.: US 11,301,419 B2
(45) Date of Patent: Apr. 12, 2022

(54) DATA RETENTION HANDLING FOR DATA OBJECT STORES

(71) Applicant: salesforce.com, inc., San Francisco, CA (US)

(72) Inventors: Shu Liu, Mountain View, CA (US); Eric Shahkarami, Redwood City, CA (US); Yuk Hei Chan, Palo Alto, CA (US); Ming-Yang Chen, Palo Alto, CA (US); Karl Ryszard Skucha, Sunnyvale, CA (US); Eli Levine, San Francisco, CA (US); Ka Chun Au, Millbrae, CA (US)

(73) Assignee: salesforce.com, inc., San Francisco, CA (US)

( * ) Notice: Subject to any disclaimer, the term of this patent is extended or adjusted under 35 U.S.C. 154(b) by 606 days.

(21) Appl. No.: 15/910,837

(22) Filed: Mar. 2, 2018

(65) Prior Publication Data
US 2019/0272335 A1 Sep. 5, 2019

(51) Int. Cl.
*G06F 16/11* (2019.01)
*G06F 16/21* (2019.01)

(52) U.S. Cl.
CPC .......... *G06F 16/125* (2019.01); *G06F 16/21* (2019.01)

(58) Field of Classification Search
CPC .............................. G06F 16/125; G06F 16/21
See application file for complete search history.

(56) References Cited

U.S. PATENT DOCUMENTS

| 7,577,689 | B1 * | 8/2009 | Masinter | G06F 11/1464 |
| 9,063,946 | B1 * | 6/2015 | Barber | G06F 16/125 |
| 9,912,752 | B1 * | 3/2018 | Davis | H04L 67/1097 |
| 2008/0243878 | A1 * | 10/2008 | de Spiegeleer | G06F 11/1448 |

(Continued)

FOREIGN PATENT DOCUMENTS

WO WO 2006045767 A1 5/2006

OTHER PUBLICATIONS

ISR/EP, International Search Report and Written Opinion of the International Searching Authority, Intt'l Appl. No. PCT/UUS2019/013933, dated Apr. 8, 2019, European Patent Office, Rijswijk, The Netherlands, 15pgs.

*Primary Examiner* — Pierre M Vital
*Assistant Examiner* — Zuheir A Mheir
(74) *Attorney, Agent, or Firm* — Holland & Hart LLP

(57) ABSTRACT

Methods, systems, and devices for data retention handling are described. In some data storage systems, data objects are stored in a non-relational database schema. The system may support configurable data retention policies for different tenants, users, or applications. For example, a data store may receive retention requests, where the retention requests may specify deletion or exportation actions to perform on records contained within data objects. The data store may determine retention rules based on these retention requests, and may periodically or aperiodically evaluate the rules to determine active actions to perform. To improve the efficiency of the system, the data store may aggregate the active actions (e.g., according to the dataset to perform the actions on), and may generate work items corresponding to the aggregate actions. A work processor may retrieve these work items and may efficiently perform the data retention actions on datasets stored in the data object store.

20 Claims, 12 Drawing Sheets

(56) References Cited

U.S. PATENT DOCUMENTS

| | | |
|---|---|---|
| 2010/0332401 A1 | 12/2010 | Prahlad et al. |
| 2011/0055559 A1* | 3/2011 | Li .................... H04L 9/0894 |
| | | 713/165 |
| 2015/0186081 A1* | 7/2015 | Albrecht ............ G06F 3/1273 |
| | | 358/3.28 |
| 2017/0351727 A1* | 12/2017 | Zbogar-Smith ....... G06F 16/125 |
| 2018/0276232 A1* | 9/2018 | Dhanasekaran ...... G06F 3/0605 |
| 2019/0207929 A1* | 7/2019 | Koorapati ............ G06F 16/16 |

* cited by examiner

DATA RETENTION HANDLING FOR DATA OBJECT STORES

FIELD OF TECHNOLOGY

The present disclosure relates generally to database systems and data processing, and more specifically to data retention handling for data object stores.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, data retention regulations may apply to the cloud platform. These data retention regulations may specify functionality (e.g., deleting or exporting data records) for the cloud platform to support on demand. Additionally, in some cases, the cloud platform may include a file-based system (e.g., a data object store) that stores data in a non-relational database schema. Accessing data for deletion or exportation in a massive file-based system may be computationally expensive and can introduce latency.

DETAILED DESCRIPTION

Figure 1:
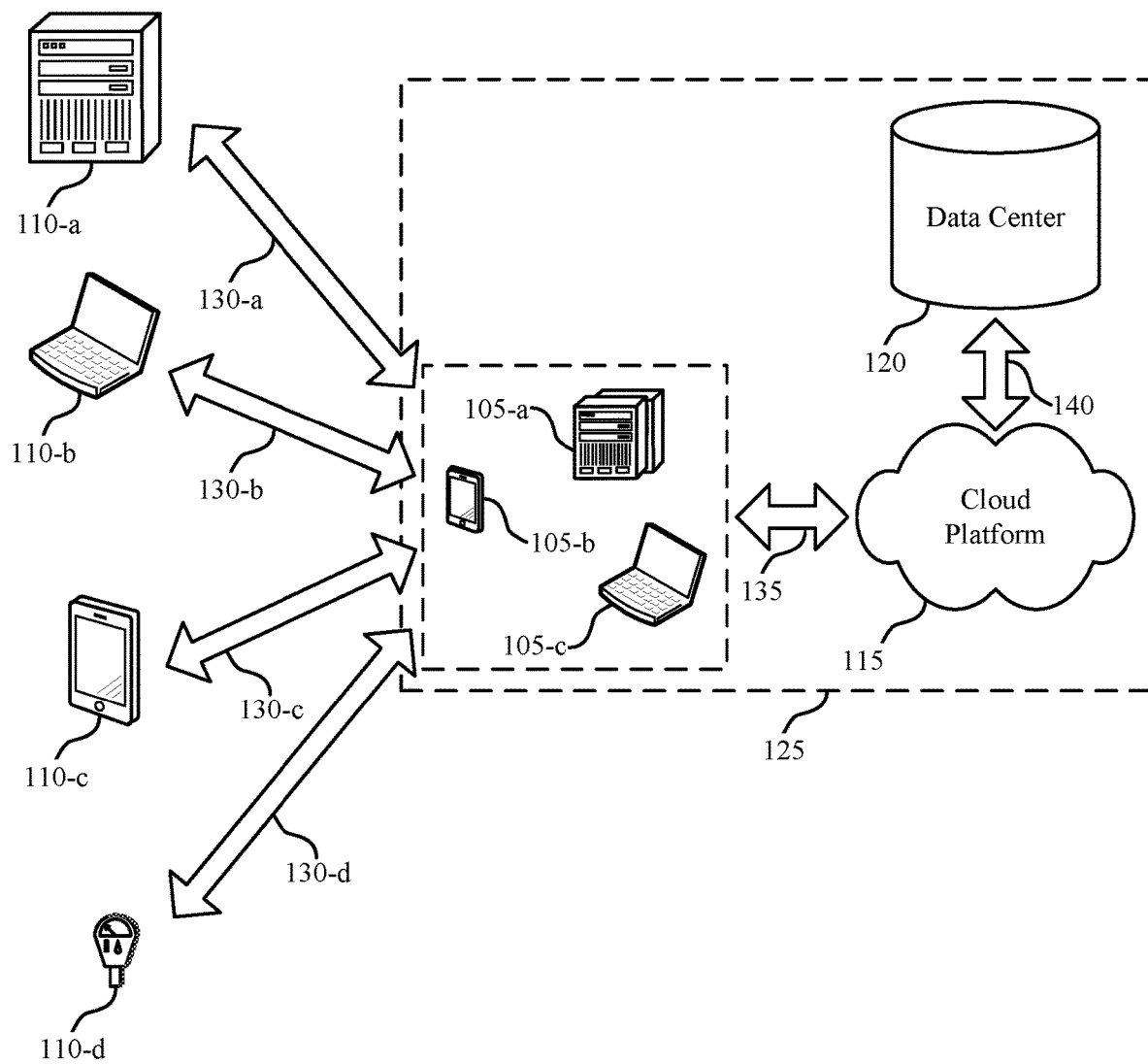
FIG. 1 illustrates an example of a system for data processing at a data object store that supports data retention handling for data object stores in accordance with aspects of the present disclosure.

A cloud platform may include a data platform for handling, processing, and storing data. For example, the cloud platform may include a data center with data object stores, databases, and application programming interfaces (APIs). Data object stores may store information as data objects using non-relational database schemas. Users may interact with these data object stores using one or more APIs as gateways to access or modify the data. In some cases, these APIs utilize authorization procedures (e.g., authentication tokens) to restrict access to data stored in the data center. For example, in a multi-tenant database system, the APIs may allow users associated with a tenant to modify or access data for that tenant, but may not allow the users to modify or access data for other tenants. In some examples, the modifying or accessing may be associated with data retention policies or procedures.

For example, a data store may support configurable data retention policies. These data retention policies may be user-specific, tenant-specific, application-specific, or some combination thereof. The configurable data retention policies may specify when or how data is to be deleted or accessed from the data store. A user may transmit a data retention request to the data store (e.g., via a data retention API) corresponding to exporting or deleting data objects or data object records. Alternatively, the data store may retrieve or generate (e.g., based on a trigger) data retention requests to perform. The data retention requests may be stored in a relational database table for further usage or consolidation purposes. The data store may determine retention rules based on these data retention requests, and may evaluate the retention rules to determine active actions due to be performed on stored datasets.

The data store may aggregate these active actions into work items for more efficient processing, and may store these consolidated work items in memory (e.g., in a work item table). One or more work processors may retrieve the work items from memory according to a work processor scheduling, and may consume the work items in order to perform the actions on the stored datasets. For example, the work processors may delete data objects or data object records from a data object store, or may identify and export a path or link to access data objects or data object records in the data object store. The data store may implement this data retention procedure to support deprovisioning of tenants, user-specific record deletion, time-to-live (TTL) policies, record export requests, restrict from processing requests, or any other functions associated with the configurable data retention policies. By aggregating the active actions, the system may reduce the processing overhead and latency for the work processors, as a work processor may identify a dataset a single time, and perform all associated data retention processes on the identified dataset.

Aspects of the disclosure are initially described in the context of an environment supporting an on-demand database service. Additional aspects of the disclosure are described with reference to systems, a data store architecture, and a process flow. Aspects of the disclosure are further illustrated by and described with reference to apparatus diagrams, system diagrams, and flowcharts that relate to data retention handling for data object stores.

FIG. 1 illustrates an example of a system 100 for cloud computing that supports data retention handling for data object stores in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may support data retention handling for tenants, users, or both. For example, the system 100 may provide data retention functionality (e.g., including deleting data, exporting data, etc.) according to one or more data retention regulations or data retention policies. This functionality may include tenant deprovisioning (e.g., in a multi-tenant database system), record deletion, TTL processes, data exporting, data restriction from processing, or some combination of these or other functions. For example, tenant deprovisioning may involve deleting all datasets for a tenant stored in data center 120 (e.g., after a specified grace period). Record deletion may involve deleting all data objects or data object records associated with a list of record identifiers or associated with a specific user. TTL processes may involve deleting certain types of data (e.g., comma-separated values (CSV) formatted tenant data, snapshots, scoring datasets, etc.) after a specified amount of time, and may include configurable TTL values defining the amount of time. Data exporting may involve exporting data in its original format based on identifiers indicating the data. Data restriction from processing may involve exporting and deleting data based on identifiers indicating the data. In some cases, providing these functions may allow data center 120 to support certain data retention regulations or policies.

The data center 120 may include data stored in different formats. For example, the data center 120 may include data stored in a file-based system (e.g., according to a data lake infrastructure), and in some cases may also include data stored in a relational database system. To support data retention for datasets, data objects, data object records, or a combination of these stored in a file-based system, the data center 120 may implement data retention rules, rule evaluators, and work items. For example, the data center 120 may receive data retention requests from users or tenants (e.g., via cloud clients 105 or contacts 110), and may determine data retention rules based on these requests. Periodically or aperiodically, rule evaluators may evaluate the data retention rules, and may perform aggregation or consolidation to efficiently group the rules to be performed (e.g., according to shared datasets). The evaluators may generate work items based on these consolidated rules to be performed, where the work items are formatted for consumption by work processors. These work processors may consume the work items in order to perform the data retention functionality on the datasets, data objects, or data object records stored in the file-based system.

In conventional systems, data retention may be supported for relational databases. However, identifying and deleting a field in a relational database system may be much less computationally expensive than identifying and deleting a data object record in a file-based data object store. Additionally, conventional systems may provide global data retention functionality to support data retention policies across all data stored in the databases.

System 100 may support a flexible and extensible data retention system that may include modified data retention policies for different tenants, different users, different applications, or some combination thereof. For example, users may specify configurable user-specific data retention policies for the data center 120 to utilize. This flexibility may allow the data center 120 to retain data more efficiently based on user-specific or application-specific needs or operations. Additionally, by implementing configurable data retention rules, evaluators, and work items, the system 100 may handle changes in future data retention policies or regulations.

The data center 120 may also utilize consolidation of work items to improve the efficiency and reduce the latency of deleting or exporting data records from a file-based system. For example, the aggregation of actions on a dataset-by-dataset basis may allow work processors to efficiently modify data stored in data center 120. Accessing a dataset in a data object store may be associated with inherent processing overhead and latency. By minimizing the number of times a work processor accesses a dataset for modification, the system 100 improves the efficiency of the data retention process. Additionally or alternatively, utilizing retention rule grace periods may allow the data center 120 to remain live during data retention procedures without a reduction of reliability. For example, the grace periods may result in repeated work item generation, identifying newly added data objects or datasets associated with a retention rule, and reliably applying the dataset modifications across all datasets stored in the data center 120.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
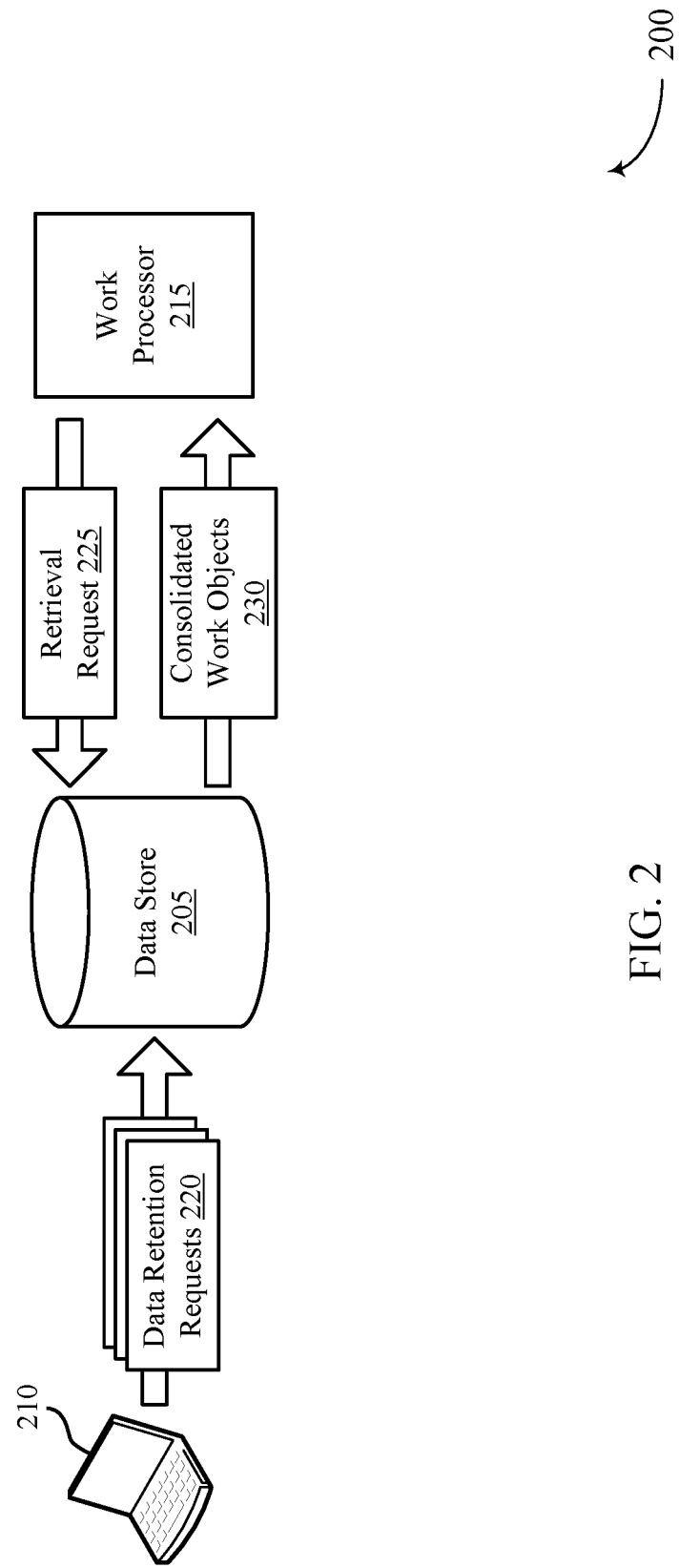
FIGS. 2 and 3 illustrate examples of systems that support data retention handling for data object stores in accordance with aspects of the present disclosure.

FIG. 2 illustrates an example of a system 200 that supports data retention handling for data object stores in accordance with aspects of the present disclosure. The system 200 may include a data store 205, which be a component of the data center 120 described with reference to FIG. 1. The data store 205 may include a data lake infrastructure built on a data object store, or built on a combination of a data object store and an associated relational data store. The data object store may be an example of a file based storage system (e.g., where data is stored as data objects in a non-relational database schema), as opposed to a relational database system. The system 200 may also include a user device 210, which may be an example of a cloud client 105 or a contact 110 as described with reference to FIG. 1. The user device 210 may be operated by a user associated with data stored at the data store 205. For example, in a multi-tenant environment, the user may be associated with a tenant of the data store 205. Additionally, the system 200 may include a work processor 215, which in some cases may also be a component of the data center 120 described with reference to FIG. 1. The work processor 215 may run on a server or server cluster (e.g., a database server, an application server, etc.).

The data store 205 may support one or more data retention policies. These data retention policies may be global policies across all tenants of the data store 205 (e.g., related to industry standards or data retention regulations), or may be tenant, user, or application specific policies (e.g., configured by a tenant). By supporting tenant, user, or application specific data retention policies configurable by users, the data store 205 may implement a flexible and extensible data retention system. In some cases, the tenant, user, or application specific data retention policies may follow industry standards or data retention regulations, but may slightly modify the global policies to meet certain application-specific requirements or implementations. For example, rather than delete data objects or records contained within data objects when deprovisioning a tenant or removing information for a user, a configurable data retention policy may instead utilize a TTL value for deleting the data objects or data object records after a specified amount of time has passed.

The data store 205 may receive data retention requests 220 indicating data retention actions to perform on one or more datasets stored in the data store 205. In some cases, the data store 205 may receive these data retention requests 220 based on user input at a user device 210. In other cases, the data store 205 may periodically or aperiodically retrieve data retention requests (e.g., in one or more batches) from a tenant system. These data retention requests may include a number of parameters, where each parameter may contain a default value or a value specified by a tenant or a user (e.g., a user associated with the tenant). The data store 205 may determine actions to perform on datasets stored in memory based on these received data retention requests.

For example, the data store 205 may evaluate the data retention requests to determine any active data retention requests. An active data retention request may be an example of a retention request with an action that is due to be performed. For example, for a data retention request specifying an expiration date for a dataset, the data store 205 may determine that the data retention request is active on or after this specified expiration date. Based on the active data retention requests, the data store 205 may determine corresponding active actions to perform.

To improve the efficiency of the data retention system, the data store 205 may perform a consolidation process on these active actions. For example, the data store 205 may aggregate the active actions into one or more aggregate actions. An aggregate action may include multiple actions to perform on a same dataset. In some cases, these multiple actions may be a same type of action (e.g., deleting a data object or a record contained in a data object). In other cases, these multiple actions may include different types of actions (e.g., deleting data and exporting data). In some examples, the set of aggregate actions may include single actions (e.g., actions that could not be aggregated with any other actions based on the indicated dataset). The data store 205 may generate consolidated work objects, which may be referred to as work items, based on the aggregate actions. For example, each consolidated work object may include a work item type (e.g., corresponding to an action type of an aggregate action) and an indication of a dataset to perform the action on. In some implementations, the data store 205 may generate one consolidated work object for each aggregate action.

The data store 205 may receive a retrieval request 225 from a work processor 215. This work processor retrieval request may be sent according to scheduling of the work processor 215 (e.g., based on a pre-defined periodicity, a delay from a most recent processing procedure, etc.). In some cases, the work processor 215 may be associated with a specific type of work item. In these cases, the retrieval request 225 may fetch any generated consolidated work objects of that work item type stored in the data store 205. Additional work processors 215 may fetch the other work item types (e.g., according to the same or different scheduling). In other cases, the work processor 215 may fetch a variety of work item types. In response to the retrieval request 225, the data store 205 may transmit the fetched consolidated work objects 230 to the work processor 215 for processing.

The work processor 215 may process these consolidated work objects. For example, the work processor 215 may modify data objects or data object records stored in the data object store based on the work objects. These modifications may include deleting data objects or data object records from memory, exporting links or paths (e.g., to a user device 210) for accessing data objects or data object records in a specific data format, or some combination of these modifications. In some cases, the work processor 215 may additionally or alternatively modify metadata stored in a metadata database and associated with a dataset in the data object store.

By aggregating the active actions, and transmitting the resulting consolidated work objects for processing, the data store 205 may efficiently utilize resources and reduce latency for the work processor 215. For example, by aggregating according to a shared dataset, the work processor 215 may identify the dataset within the data object store once, and may perform all of the modifications to that dataset during a single work processor 215 procedure. As locating datasets within a massive file based system may be computationally expensive, implementing the system 200 with consolidated work objects 230 may significantly reduce processing overhead and latency.

Figure 3:
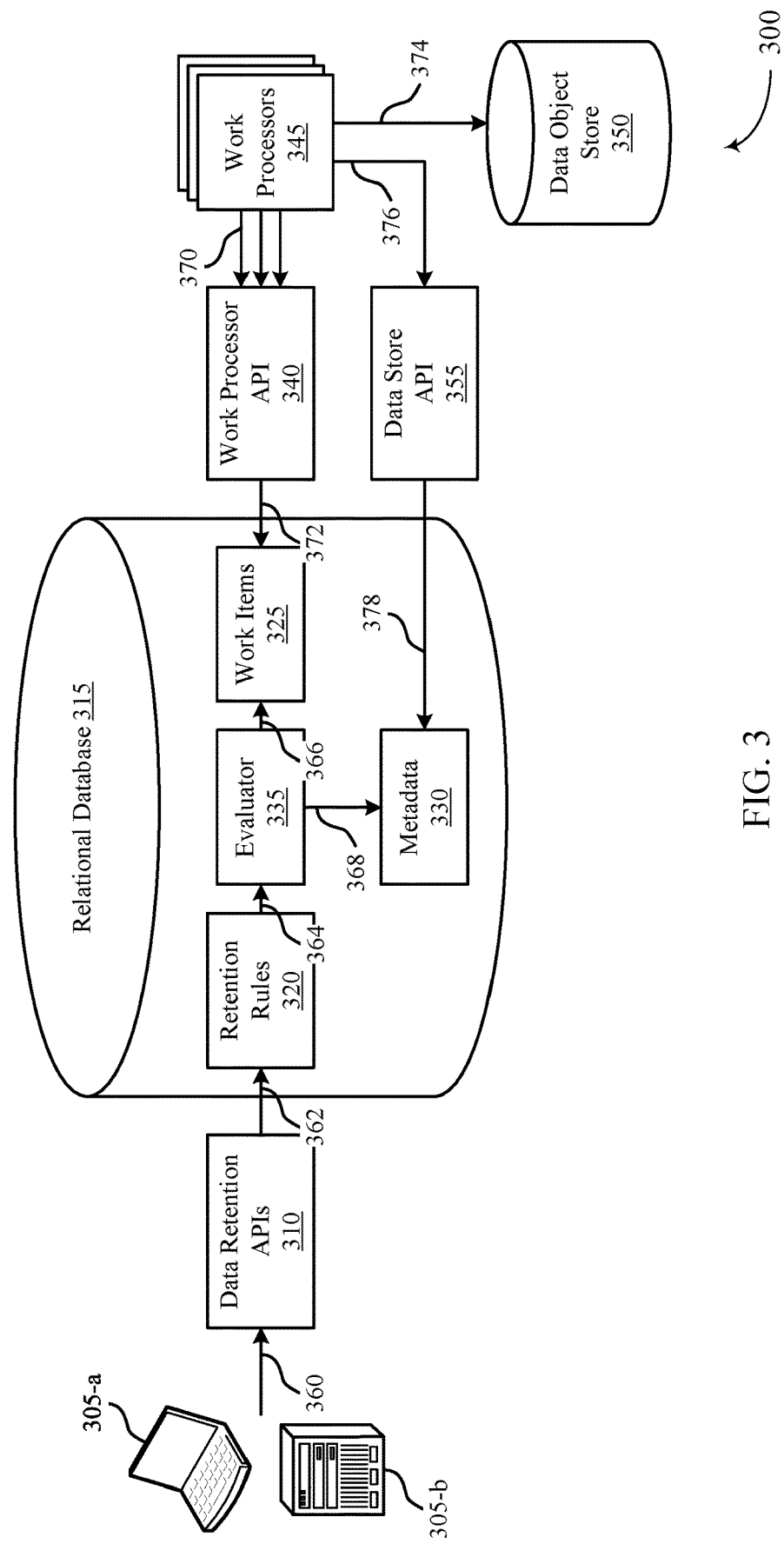

FIG. 3 illustrates an example of a system 300 that supports data retention handling for data object stores in accordance with aspects of the present disclosure. The system 300 may include a relational database 315, a data object store 350, and work processors 345. In some cases, the relational database 315, data object store 350, and work processors 345 may be components of a database system or data center 120, as described with reference to FIG. 1. This database system may additionally include multiple APIs, such as data retention APIs 310, work processor APIs 340, data store APIs 355, or some combination of these. These APIs may handle requests for the relational database 315, data object store 350, or work processors 345 of the database system. In some cases, the relational database 315 may store information in a relational database schema, while the data object store 350 may store data objects in a non-relational database schema. For example, the data object store 350 may store data objects in a format utilized for efficient machine learning, while the relational database 315 may store metadata of the objects stored in the data object store 350 and the associated data retention requests.

The database system may receive retention requests, which may be referred to as data retention requests, from a user or tenant system at 360. For example, a user associated with a tenant of the database system may transmit one or more retention requests using a device 305, such as device 305-a or device 305-b. These retention requests may be sent based on a user input to a user device, or based on an automatic process (e.g., sent at a pre-determined periodicity, or aperiodically triggered). In other examples, these retention requests may be retrieved by a data retention API 310. One or more data retention APIs 310 may process the retention requests for the database system. For example, the data retention APIs 310 may identify parameters of the retention requests, and may determine rules based on these parameters. Retention request parameters may include a namespace, a tenant identifier (e.g., associated with the user sending the retention requests), an action to perform on a dataset, data object, or data object record, an application name (e.g., for application-specific retention requests), an entity (e.g., for entity-specific retention requests within the tenant), or some combination of these or other parameters. The data retention APIs 310 may construct one or more retention rules based on the identified parameters of the received retention requests, and may send these rules to the relational database 315 at 362. The relational database 315 may store the retention rules 320 in memory (e.g., in a retention rule table).

The retention rules 320 may be used by the relational database 315 to evaluate datasets for retention-related work. For example, the retention rules 320 may allow the database system to perform functions corresponding to data retention policies. Each retention rule may include information applicable to filter datasets stored in the data object store 350, and information indicating an action to perform on these filtered datasets. An evaluator 335 may use this information to create work items 325. For example, the evaluator 335 may periodically evaluate the retention rules 320 (e.g., at 364, according to a pre-determined or configurable periodicity), and may identify any active rules. Alternatively, the evaluator 335 may evaluate the retention rules 320 based on some trigger (e.g., a user input). The evaluator 335 may generate a list of work items 325, which may be referred to as work objects, based on the active retention rules. At 366, the relational database 315 may store the work items 325 in memory (e.g., in a work item table). Additionally or alternatively, the evaluator 335 may update metadata 330 (e.g., in a metadata table) at 368. For example, the evaluator 335 may update an expiry date for a dataset indicated in the metadata 330, instead of creating a work item for processing.

In some cases, the evaluator 335 may consolidate the work items 325 to improve the efficiency of the system. For example, if the active retention rules indicate multiple actions for a same dataset, the evaluator 335 may aggregate these actions and generate a consolidated work item corresponding to the aggregate actions and the dataset. Alternatively, if the active retention rules indicate a same action for multiple datasets, the evaluator 335 may aggregate these datasets and generate a consolidated work item corresponding to the action and the aggregate datasets. In some cases, the evaluator 335 may not modify work items 325 previously stored in the memory of the relational database 315, and may instead consolidate newly generated work items during each evaluation of the retention rules 320. In other cases, for each evaluation of the retention rules 320, the evaluator 335 may consolidate the newly generated work items with any unprocessed work items 325 stored in memory.

Because the evaluator 335 generates work items for the identified active retention rules, and does not generate work items for inactive retention rules, the work items 325 stored in memory are all ready to be processed. Correspondingly, any work that is not due to be performed is not added to the work items 325 in memory. In this way, a work processor 345 may efficiently consume work items 325 stored in the memory of the relational database 315, and take actions on the indicated datasets (e.g., updating metadata 330 or datasets as applicable).

For example, work processors 345 may run at scheduled intervals to retrieve work items 325 from the relational database 315. In some cases, a single work processor 345 may process the different types of work items 325 stored in memory. In other cases, each work processor 345 may be specific to a work item type. In these cases, different work processors 345 may retrieve work items 325 according to the work item types, and may process these different types of work items separately. In some examples, the work item type-specific work processors 345 may retrieve work items 325 according to different schedules. For example, the work processors 345 may run at offset times, or may run at different length periodic intervals.

When a work processor 345 runs, the work processor 345 may query for unprocessed work items 325 by sending a work processor retrieval request to the relational database 315 (e.g., using a work processor API 340) at 370. In some cases, different work processor APIs 340 may be implemented to handle retrieval requests for different work processors 345. At 372, the work processor API 340 may read the unprocessed work items 325 from the memory of the relational database 315 (e.g., according to the work item types). The work processor API 340 may return the unprocessed work items to the work processors 345, and the work processors 345 may perform the actions or aggregate actions on the datasets indicated by the work items. In some cases, processing the work items may involve the work processors 345 modifying data objects in the data object store 350 at 374. This modifying may include deleting data objects or records contained within data objects from the data object store 350, or determining links or paths to data objects or records contained within data objects in the data object store 350, and transmitting an indication of these links or paths to a user device. Additionally or alternatively, processing the work items may involve the work processors 345 updating metadata 330 in the relational database 315. For example, a work processor 345 may send a metadata update request to a data store API 355 at 376, and the data store API 355 may update the metadata 330 at 378. After a work processor 345 has processed a work item, the work processor may mark the work item as processed in the memory of the relational database 315.

The database system may implement multiple different types of retention rules 320 and work items 325 for handling retention-related work. For example, the retention rules 320 may include expiry rules, TTL rules, sequential TTL rules, record deletion rules, export rules, restrict from processing rules, or any combination of these or other retention rules for handling datasets. Each of these retention rule types may include a number of variables configurable based on the received retention requests. Different rule types may include different variables, and in some examples may include different default values for one or more parameters. In some cases, the default values may be indicated in the received retention requests. Similarly, the work items 325 may include expiry work, record deletion work, export work, restrict from processing work, or any combination of these or other work items for performing actions on datasets or metadata 330. A work item 325 may include an indication of a dataset and an action to perform on the dataset. Each type of retention rule 320 may correspond to one or more types of work items 325. Described below are a number of exemplary retention rules 320 and corresponding work items 325 for handling data retention for a data object store 350. It is to be understood that the system 300 may support any number of these retention rules 320 and work items 325, or any other retention rules 320 or work items 325 for handling data retention for the database system (e.g. according to configurable data retention policies).

An expiry rule may indicate an absolute time at which a set of data expires. For example, the expiry rule may indicate a timestamp or a date. According to the expiry rule, when the current timestamp equals or exceeds the indicated expiration timestamp, the expiry rule may become active. A data retention request for an expiry rule may include a name space, a tenant identifier, an application name, an entity, a dataset type (e.g., tenant data, model data, score data, metrics data, or any other similar dataset type), a dataset format (e.g., Avro, binary, CSV, JavaScript object notation (JSON), etc.), a download mode (e.g., initial, recalibration, incremental, snapshot, etc.), an indication of whether to cascade the retention rule, an expiry date or expiry timestamp, or some combination of these or other relevant parameters. A data retention API 310 may use these retention request values to generate expiry rules. A retention request for an expiry rule may be used for deprovisioning a tenant or user on a certain date or at a certain time. The evaluator 335 may generate an expiry work item based on an active expiry rule.

A TTL rule may indicate a relative time at which a set of data expires. For example, the TTL rule may indicate a relative timestamp or date. The data retention API 310 may identify a creation timestamp or date for the TTL rule (e.g., when the corresponding retention request is received at the data retention API 310, when the TTL rule is generated at the data retention API 310, or when the TTL rule is stored in the relational database 315). The indicated set of data may expire an amount of time after the creation timestamp or creation date according to the relative timestamp or relative date. For example, after the indicated relative time has passed since the creation timestamp, the TTL rule becomes active. The data retention request for a TTL rule may include similar parameters to those described for an expiry rule, but may include a TTL value as opposed to an expiry date or expiry timestamp. In one specific example, a retention request for a TTI rule may be used for retention of score or CSV tenant data. In some cases, the database system may include global retention policies specifying TTL rules for certain data types (e.g., as a default across all tenants or applications). Alternatively, the database system may override these global retention policies or TTL rules based on tenant or application specific policies or rules. The evaluator 335 may generate an expiry work item based on an active TTL rule.

A sequential TTL rule may indicate datasets to save and datasets to delete based on a certain periodicity. For example, a sequential TTL rule may support saving a dataset according to a specific time interval, and may assign a TTL value to datasets created at other times not included in this specific time interval. For example, if the sequential TTL rule indicates to save a dataset every seventh day, the rule may correspondingly indicate to assign TTL values for datasets created on the other six days. In this way, the database system may store data objects or data object records with reduced granularity after a certain amount of time. The data retention request for a sequential TTL rule may include similar parameters to those described for the TTL rule, but may additionally include an interval value indicating an amount of time between "long-lived" datasets (i.e., datasets that will not be assigned TTL values based on the sequential TTL rule). In one specific use case, a sequential TTL rule may be utilized to take "snapshots" of monthly data, where datasets for the first day of each month are "long-lived," and all other datasets are assigned a TTL value (e.g., a TTL value of thirty days). The evaluator 335 may generate an expiry work item based on an active sequential TTL rule.

A record deletion rule may indicate specific data objects or specific records contained within data objects to delete from the data object store 350. For example, a data retention request for a record deletion rule may include an indication of a dataset stored in the data object store 350. In some cases, the dataset may be indicated by some combination of a name space, a tenant identifier, and an entity. In other cases, the dataset may be indicated by a dataset identifier. The data retention request may additionally include an indication of data objects or records to delete from the indicated dataset. For example, the data retention request may include a record identifier uniform resource locator (URL), which may indicate records, timestamps, or both to remove from the dataset. In some cases, the data retention request for the record deletion rule may include other additional parameters to those described above. A retention request for a record deletion rule may be used for user-specific record deletion. The evaluator 335 may generate a record deletion work item, an expiry work item, or both based on an active record deletion rule.

An export rule may indicate data to export in a specified format to a user device. Similar to the data retention request for the record deletion rule, a data retention request for an export rule may indicate a dataset (e.g., using a name space, tenant identifier, entity, dataset identifier, or combination thereof), and may indicate data objects or data object records within the indicated dataset. For example, the data retention request may include one or more record identifiers indicating the data object records to export. The data may be indicated for exportation in a specific format (e.g., CSV format) from an initial dataset, one or more incremental datasets, or both. Exporting a dataset, data objects, or data object records may involve extracting the indicated dataset, data objects, or data object records, and exporting a link or path to a user device to access the extracted data. In some cases, extracting the data may involve modifying the format of the data. The data retention request for the export rule may include other additional parameters to those described above. A retention request for an export rule may be used for exporting user-specific or tenant-specific records in the original record format. The evaluator 335 may generate an export work item based on an active export rule.

A restrict from processing rule may combine aspects of the record deletion rule and the export rule. For example, a data retention request for a restrict from processing rule may indicate datasets, data objects, data object records, or a combination thereof to both export to a user device and delete from the data object store 350. The data retention request for the restrict from processing rule may include similar parameters to the data retention request for the export rule. The evaluator 335 may generate a restrict from processing work item, an expiry work item, or both based on an active restrict from processing rule.

As described above, the evaluator 335 may identify the active retention rules, and may generate work items 325 based on these active retention rules. In some cases, the evaluator 335 may consolidate work items 325 based on similar actions to perform. For example, the evaluator 335 may identify an active expiry rule and an active TTL rule for a same dataset. The evaluator 335 may aggregate the actions for these rules in order to generate a combined expiry work item for these two rules. Similarly, in some cases, the evaluator 335 may identify multiple active record deletion rules for a same dataset. These record deletion rules may indicate different sets of data object records—which may or may not be overlapping—within the dataset. The evaluator 335 may generate a combined record deletion work item for these rules (e.g., indicating the union of the indicated data object records for the different rules). The evaluator 335 may store all of the work items 325 in a work item table, and the work processors 345 may use a work processor API 340 to fetch pending work from the work item table.

For example, the work processors 345 may fetch unprocessed work items from the work items table in the memory of the relational database 315. In some cases, the work items 325 may be retrieved based on work item identifiers, dataset identifiers, rule identifiers, metadata indications, or a combination of these parameters. The work processors 345 may process these work items 325 in order to perform the rule functionality described above. For example, a work processor 345 processing an expiry work item may delete a dataset from the data object store 350, a work processor 345 processing a record deletion item may delete a data object or data object record from a dataset of the data object store 350, a work processor 345 processing an export work item may export a link or path to data objects or data object records of a dataset in the data object store 350, and a work processor 345 processing a restrict from processing work item may export a link or path to data objects or data object records of a dataset in the data object store 350, and may additionally delete these data objects or data object records after the exporting.

After processing a work item, the work processors 345 may update the work items 325 or metadata 330 associated with the work items 325 to indicate that the items have been processed. In some cases, processed work items may stay in the memory of the relational database 315 with an indication that they are processed. In other cases, the relational database 315 may remove these work items 325 from memory, for example, triggered when they are marked as processed or according to a pre-defined periodicity.

Figure 4:
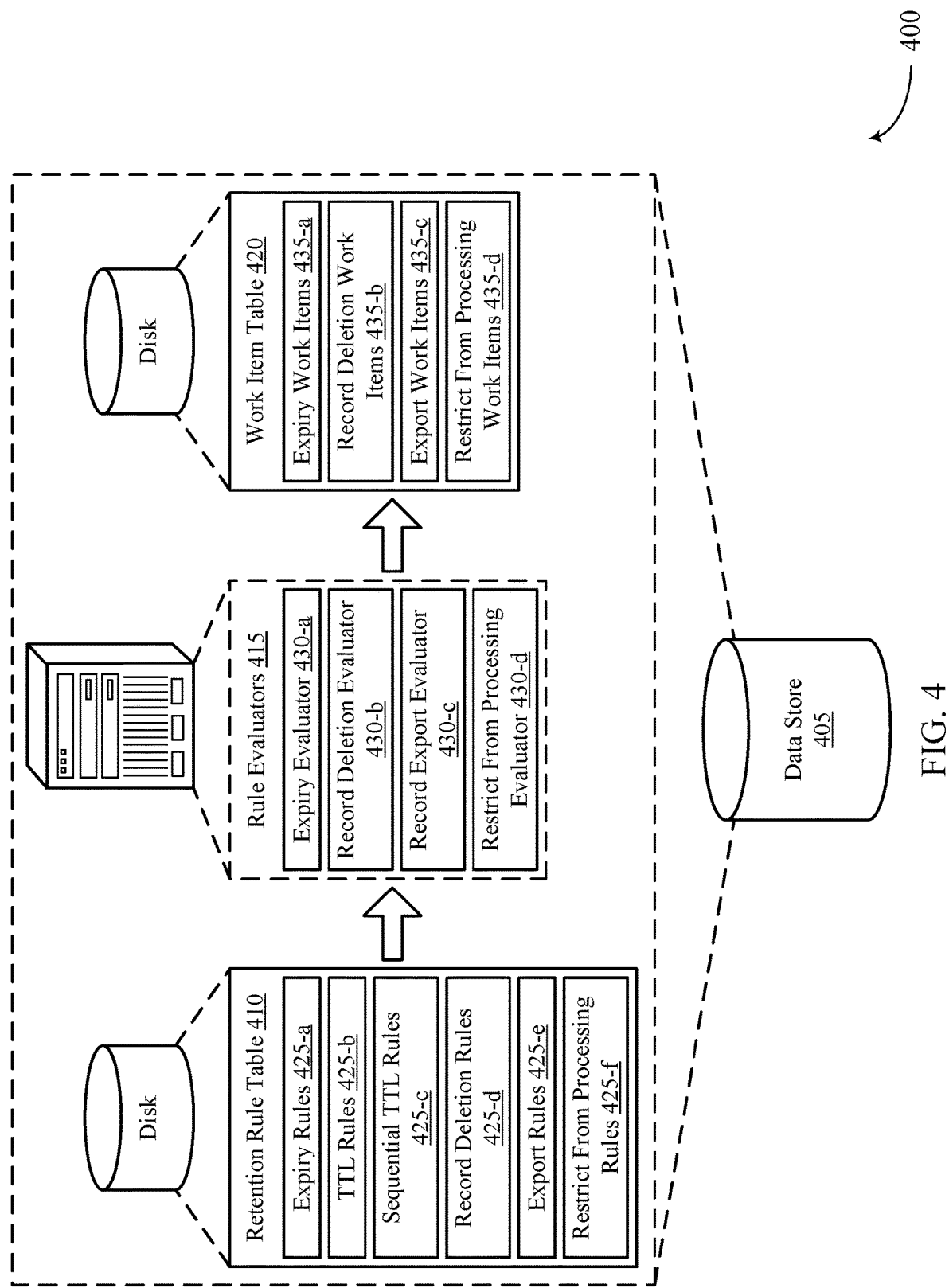
FIG. 4 illustrates an exemplary data store architecture that supports data retention handling for data object stores in accordance with aspects of the present disclosure.

FIG. 4 illustrates an exemplary data store architecture 400 that supports data retention handling for data object stores in accordance with aspects of the present disclosure. The exemplary data store architecture 400 may be implemented by a data store 405, which may be an example of a relational database 315, or may be a component of a data center 120 or a data store 205 as described with reference to FIGS. 1 through 3. The data store architecture 400 may include a retention rule table 410 and a work item table 420 stored in memory (e.g., on disk). The data store architecture 400 may additionally include one or more rule evaluators 415, which may run on a database server or server cluster. The evaluators 430 may evaluate retention rules 425 stored in the retention rule table 410, produce work items 435, and store the work items 435 in the work item table 420.

The data store 405 may support multiple different types of retention rules 425 for the retention rule table 410. For example, the data store 405 may store expiry rules 425-*a*, TTL rules 425-*b*, sequential TTL rules 425-*c*, record deletion rules 425-*d*, export rules 425-*e*, restrict from processing rules 425-*f*, or some combination of these or other data retention rules 425 in the retention rule table 410. These retention rules 425 may correspond to the rules described above, for example, with reference to FIG. 3.

The data store 405 may additionally support multiple different types of work items 435 for the work item table 420. For example, the data store 405 may store expiry work items 435-*a*, record deletion work items 435-*b*, export work items 435-*c*, restrict from processing work items 435-*d*, or some combination of these or other work items 435 in the work item table 420. A work item 435 may indicate work to be done on a dataset. The rule evaluators 415 may encode any information used by a work processor to process the dataset into the work items 435. The evaluators 430 may produce one or more work item types from an input retention rule 425. The evaluators 430 may additionally or alternatively aggregate work items 435 of a same work item type for a same dataset. Based on the aggregation procedure, processing an aggregate work item 435 on a dataset may result in the same dataset modifications as individually processing multiple work items of the same type on the same dataset. However, processing the aggregate work items 435 may reduce the processing overhead and latency of the dataset modification procedure (e.g., as opposed to individually processing the work items).

In some cases, the data store 405 may implement a grace period for retention rules 425. This grace period may have a pre-determined length (e.g., thirty days), or may be configurable on a user, tenant, or application specific basis. The grace period may define a length of time to keep a retention rule 425 active after first applying the retention rule 425. This may allow the data store 405 to handle datasets created after the retention rule 425 is applied that should be modified based on the retention rule 425. For example, the evaluators 430 may filter a group of datasets according to a retention rule 425, and may generate one or more work item 435 indicating dataset identifiers that identify the filtered datasets. The retention rule 425 may remain active for the designated grace period, and the evaluators may periodically 425 re-evaluate this retention rule 425 during the grace period. During the re-evaluation process, the evaluators 430 may re-filter the group of datasets according to the retention rule 425, and may identify any new datasets or child datasets added to the data object store after previously filtering the datasets. In this way, the data store 405 may improve the reliability of data retention processing within a live data store architecture 400.

The rule evaluators 415 may operate based on a rule type. Each rule type may be evaluated individually to produce one or more work item types by a rule type-specific evaluator 430. For example, the rule evaluators 415 may include an expiry evaluator 430-$a$, a record deletion evaluator 430-$b$, a record export evaluator 430-$c$, a restrict from processing evaluator 430-$d$, or some combination of these or other evaluators 430. In some cases, these evaluators 430 may be operated separately (e.g., using separate coding classes or methods). In other cases, these evaluators 430 may be components of a single overarching rule evaluator 415. Described below are a number of exemplary rule type-specific evaluators 430. It is to be understood that the data store 405 may support any number of these evaluators 430, or any other similar evaluators 430 for producing work items 435 based on retention rules 425.

An expiry evaluator 430-$a$ may read expiry rules 425-$a$, TTL rules 425-$b$ and sequential TTL rules 425-$c$, and may determine the active retention rules 425. The expiry evaluator 430-$a$ may produce a set of expiry work items 435-$a$ corresponding to the active retention rules 425. To consolidate the work items 435, the expiry evaluator 430-$a$ may aggregate based on a minimum expiry date on a dataset-by-dataset basis. In some cases, the expiry evaluator 430-$a$ may identify an active expiry rule 425-$a$, TTL rule 425-$b$, or sequential TTL rule 425-$c$ with no pending items (e.g., work items 435 corresponding to datasets, data objects, or data object records, for deletion). For example, the expiry evaluator 430-$a$ may have previously generated an expiry work item 435-$a$ for the active rule that has been processed by a work processor. In these cases, the expiry evaluator 430-$a$ may determine if the grace period for the active rule has ended. If the grace period has ended and there are no pending items for an active retention rule 425, the expiry evaluator 430-$a$ may either mark the retention rule 425 as inactive, or may remove the retention rule 425 from the retention rule table 410.

A record deletion evaluator 430-$b$ may read record deletion rules 425-$d$, and may determine any active record deletion rules 425-$d$. The record deletion evaluator 430-$b$ may produce a set of record deletion work items 435-$b$, a set of expiry work items 435-$a$, or a combination thereof based on the records to delete. For example, the record deletion evaluator 430-$b$ may identify datasets directly indicated by the record deletion rules 425-$d$, and may produce record deletion work items 435-$b$ for these datasets (e.g., aggregating based on a union of data object record identifiers). The record deletion evaluator 430-$b$ may additionally identify any datasets derived based on these directly indicated datasets, and may produce expiry work items 435-$a$ for the derived datasets that correspond to the directly indicated datasets with deleted records.

For a given dataset, the record deletion evaluator 430-$b$ may aggregate on record deletion rules 425-$d$ that have not previously been applied to the dataset. If the record deletion evaluator 430-$b$ identifies a record deletion rule 425-$d$ with no pending expiry work items 435-$a$ in the work item table 420, the record deletion evaluator 430-$b$ may determine whether the grace period has ended for the record deletion rule 425-$d$. If so, the record deletion evaluator 430-$b$ may mark the record deletion retention rule 425-$d$ as inactive, or may remove the record deletion retention rule 425-$d$ from the retention rule table 410.

In one specific example, the record deletion evaluator 430-$b$ may identify any record deletion rules 425-$d$ indicating deletions that happen at most a specific number of days after the creation date of a dataset, for which the record deletion evaluator 430-$b$ has not generated any corresponding work items 435. The specific number of days may be based on a snapshot interval, an amount of slack for resolving race conditions for in-flight datasets at the time of the deletion, or a combination of these factors. For example, for a daily snapshot (e.g., corresponding to a value of "1") and a slack amount of one day (i.e., a value of "+1"), the record deletion evaluator 430-$b$ may identify any record deletion rules 425-$d$ indicating deletions that happen at most 1+1=2 days after the creation date of the dataset. If the record deletion evaluator 430-$b$ determines one or more records to delete for the dataset, the record deletion evaluator 430-$b$ may identify any previous versions of the dataset and may additionally delete the corresponding records from these versions (e.g., if work has not yet been scheduled or performed on these versions). Some actions may have exceptions to this procedure, such as an un-delete action, which may not result in any modification of the dataset. Additionally or alternatively, other intervals of snapshots (e.g., alternate snapshots or monthly snapshots) may result in different specific numbers of days.

A record export evaluator 430-$c$ may read export rules 425-$e$, and may determine any active export rules 425-$e$ in the retention rule table 410. The record export evaluator 430-$c$ may produce a set of export work items 435-$c$ based on the active export rules 425-$e$, and may consolidate the export work items 435-$c$ by taking the union of record identifiers for each dataset. For a given dataset, the record export evaluator 430-$c$ may aggregate on export rules 425-$e$ that have not previously been applied to the dataset. When the record export evaluator 430-$c$ identifies an active export rule 425-$e$, the record export evaluator 430-$c$ may produce the corresponding export work item 435-$c$, and may either mark the export rule 425-$e$ as inactive or remove the export rule 425-$e$ from the retention rule table 410.

A restrict from processing evaluator 430-$d$ may read restrict from processing rules 425-$f$, and may determine any active restrict from processing rules 425-*f*. For datasets directly captured by the rule, the restrict from processing evaluator 430-*d* may produce restrict from processing work items 435-*d*, aggregated based on a union of record identifiers. For other datasets derived from these datasets, the restrict from processing evaluator 430-*d* may produce expiry work items 435-*b*. For a given dataset, the restrict from processing evaluator 430-*d* may aggregate on restrict from processing rules 425-*f* that have not previously been applied to a dataset (e.g., obtained from the work item table 420). When the restrict from processing evaluator 430-*d* identifies an active restrict from processing rule 425-*f* with no pending expiry work items 435-*a*, the restrict from processing evaluator 430-*d* may either mark the restrict from processing rule 425-*f* as inactive or may remove the restrict from processing rule 425-*f* from the retention rule table 410.

The retention rule table 410 may store a number of defined parameters for the retention rules 425. For example, the retention rule table 410 may store rule identifiers, name spaces, tenant identifiers, application names, entities, data set types, data set formats, rule types, creation dates, indications of whether the rule is active or not, metadata information, or some combination of these or other relevant parameters in memory. Similarly, the work item table 420 may store a number of defined parameters for the work items 435. For example, the work item table 420 may store work item identifiers, dataset identifiers, rule identifiers, work item types, indications of whether the work item is processed or not, processed dates, creation dates, metadata information, or some combination of these or other relevant parameters in memory.

Figure 5:
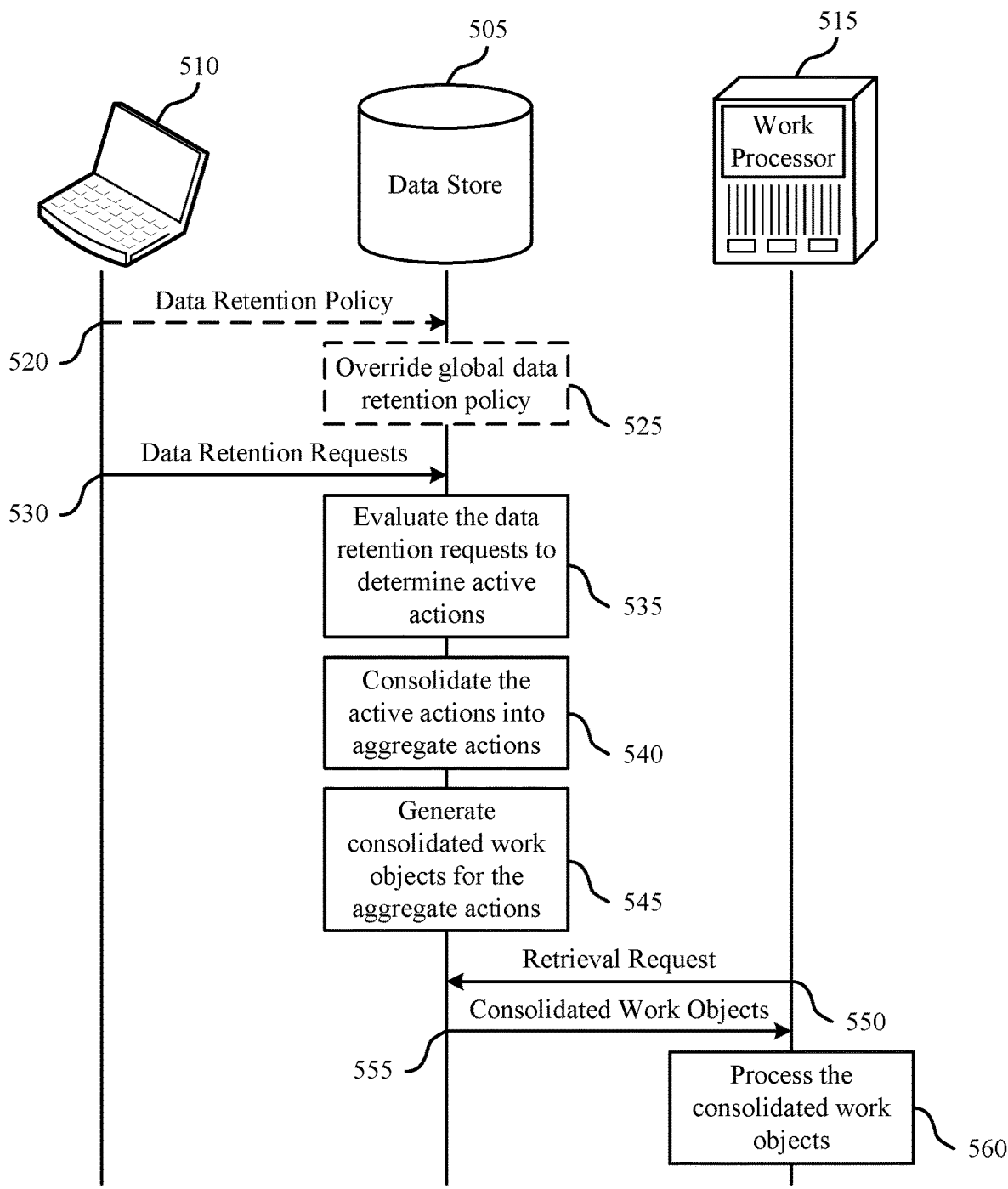
FIG. 5 illustrates an example of a process flow that supports data retention handling for data object stores in accordance with aspects of the present disclosure.

FIG. 5 illustrates an example of a process flow 500 that supports data retention handling for data object stores in accordance with aspects of the present disclosure. The process flow 500 may include a data store 505, a user device 510, and a work processor 515. The data store 505 may be a component of a data center 120, or may be an example of a data store 205, a relational database 315, a data object store 350, or a data store 405 as describe with reference to FIGS. 1 through 4. The user device 510 may be an example of a cloud client 105, a contact 110, a user device 210, or a device 305 as described with reference to FIGS. 1 through 3. The work processor 515 may be a single work processor or a collection of work item-specific work processors, and may be an example of a work processor 215 or 345 as described with reference to FIGS. 2 and 3. The data store 505 may handle data retention for a data object store, which may be a component of the data store 505, or may be associated with the data store 505 within a data center.

The data store 505 may include data retention policies for datasets stored in the data object store. These data retention policies may be examples of global data retention policies applicable to all tenants and applications. In some cases, at 520, the user device 510 may transmit a configurable data retention policy for a tenant or user associated with the user device 510 to the data store 505. The data store 505 may receive the data retention policy, and at 525 may override one or more global data retention policies in order to implement the configurable data retention policy. The data store 505 may identify the data retention policy or policies for one or more datasets stored in the data object store according to the global and configurable data retention policies.

At 530, the user device 510 may transmit data retention requests to the data store 505. These data retention requests may be associated with one or more actions for the datasets stored in the data object store, where each request corresponds to an action to perform on at least one dataset of the data object store.

At 535, the data store 505 may evaluate the data retention requests to determine a set of active data retention request associated with one or more active actions. For example, the data store 505 may store the retention requests as retention rules in a retention rule table as described, for example, with reference to FIGS. 3 and 4. An evaluator may determine whether these retention rules are active based on the rule type and, in some cases, a current timestamp.

At 540, the data store 505 may consolidate the one or more active actions into one or more aggregate actions. Each of these aggregate actions may correspond to multiple active data retention requests for a same dataset. At 545, the data store 505 may generate consolidated work objects (e.g., work items) for the aggregate actions. For example, the data store 505 may generate a consolidated work object for each aggregate action, including a work item type corresponding to the aggregate action and a dataset identifier corresponding to the dataset. In some cases, the data store 505 may store these generated work objects in a work items table.

At 550, a work processor 515 may fetch work objects from the data store 505 using a work processor retrieval request (e.g., via a work processor API). In some cases, the work processor 515 may fetch work objects of a particular work item type. Additionally or alternatively, the work processor 515 may fetch work objects according to a predetermined or configurable schedule. At 555, the data store 505 may transmit, to the work processor 515, an indication of the work objects.

At 560, the work processor 515 may process the retrieved work objects. The work processor 515 may process the work objects according to the identified data retention policy or policies. In some cases, processing the work objects may involve exporting or deleting data objects or data object records from the data object store.

Figure 6:
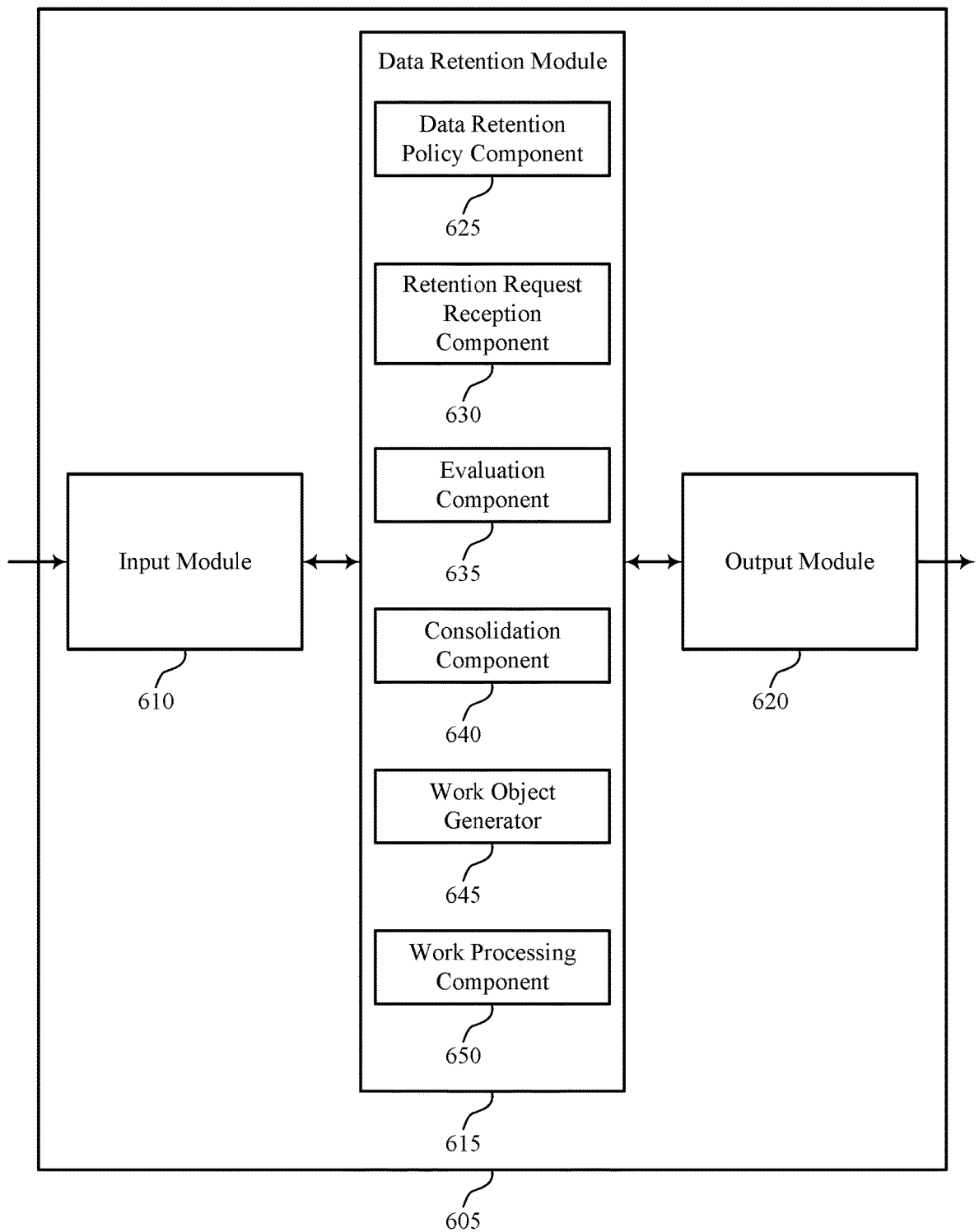
FIGS. 6 and 7 show block diagrams of a device that supports data retention handling for data object stores in accordance with aspects of the present disclosure.

FIG. 6 shows a block diagram 600 of an apparatus 605 that supports data retention handling for data object stores in accordance with aspects of the present disclosure. Apparatus 605 may include input module 610, data retention module 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Data retention module 615 may be an example of aspects of the data retention module 715 or 815 described with reference to FIGS. 7 and 8. Data retention module 615 may also include data retention policy component 625, retention request reception component 630, evaluation component 635, consolidation component 640, work object generator 645, and work processing component 650.

Data retention module 615 and/or at least some of its various sub-components may be implemented in hardware, software executed by a processor, firmware, or any combination thereof. If implemented in software executed by a processor, the functions of the data retention module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data retention module 615 and/or at least some of its various sub-components may be physically located at various positions, including being distributed such that portions of functions are implemented at different physical locations by one or more physical devices. In some examples, data retention module 615 and/or at least some of its various sub-components may be a separate and distinct component in accordance with various aspects of the present disclosure. In other examples, data retention module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Data retention policy component 625 may identify a configurable data retention policy for one or more datasets stored in a data object store. Retention request reception component 630 may receive a set of data retention requests associated with one or more actions for the one or more datasets, where each data retention request corresponds to an action to perform on at least one dataset of the one or more datasets stored in the data object store, and where the one or more actions correspond to exporting or deleting data objects, data object records, or a combination thereof according to the configurable data retention policy.

Evaluation component 635 may evaluate the set of data retention requests to determine a set of active data retention requests associated with one or more active actions. Consolidation component 640 may consolidate the one or more active actions into one or more aggregate actions, where each aggregate action corresponds to one or more active data retention requests of the set of active data retention requests to perform on a dataset.

Work object generator 645 may generate a consolidated work object for each aggregate action, where each consolidated work object includes a work item type corresponding to the aggregate action and a dataset identifier corresponding to the dataset. Work processing component 650 may transmit, to a work processor, an indication of the generated consolidated work objects in response to a work processor retrieval request, where the work processor processes the generated consolidated work objects in accordance with the configurable data retention policy.

Figure 7:
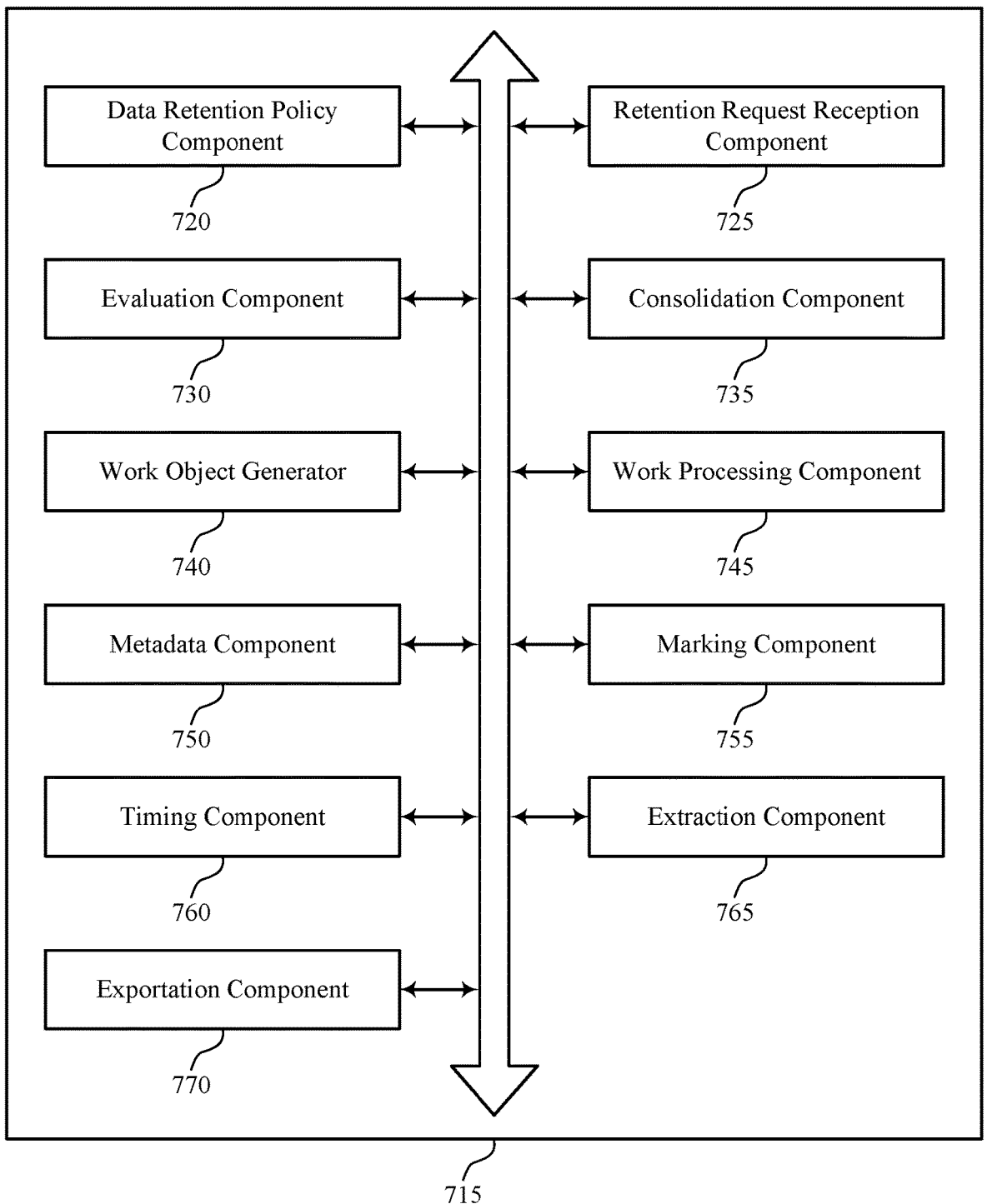

FIG. 7 shows a block diagram 700 of a data retention module 715 that supports data retention handling for data object stores in accordance with aspects of the present disclosure. The data retention module 715 may be an example of aspects of a data retention module 615 or 815 described with reference to FIGS. 6 and 8. The data retention module 715 may include data retention policy component 720, retention request reception component 725, evaluation component 730, consolidation component 735, work object generator 740, work processing component 745, metadata component 750, marking component 755, timing component 760, extraction component 765, and exportation component 770. Each of these modules may communicate, directly or indirectly, with one another (e.g., via one or more buses).

Data retention policy component 720 may identify a configurable data retention policy for one or more datasets stored in the data object store. In some examples, the one or more datasets include data formatted in a non-relational database schema. In some cases, data retention policy component 720 may receive, from a user device, the configurable data retention policy, where the configurable data retention policy is for a tenant or a user corresponding to the one or more datasets. The configurable data retention policy may override one or more global data retention policies for the data object store.

Retention request reception component 725 may receive a set of data retention requests associated with one or more actions for the one or more datasets, where each data retention request corresponds to an action to perform on at least one dataset of the one or more datasets stored in the data object store, and where the one or more actions correspond to exporting or deleting data objects, data object records, or a combination thereof according to the configurable data retention policy. In some cases, receiving the set of data retention requests includes periodically retrieving batches of data retention requests.

Evaluation component 730 may evaluate the set of data retention requests to determine a set of active data retention requests associated with one or more active actions. In some cases, the set of data retention requests are evaluated according to a dynamic or pre-determined periodicity.

Consolidation component 735 may consolidate the one or more active actions into one or more aggregate actions, where each aggregate action corresponds to one or more active data retention requests of the set of active data retention requests to perform on a dataset.

Work object generator 740 may generate a consolidated work object for each aggregate action, where each consolidated work object includes a work item type corresponding to the aggregate action and a dataset identifier corresponding to the dataset.

Work processing component 745 may transmit, to a work processor, an indication of the generated consolidated work objects in response to a work processor retrieval request, where the work processor processes the generated consolidated work objects in accordance with the configurable data retention policy. In some cases, work processing component 745 may receive a set of work processor retrieval requests according to a work processor periodicity, where each work processor retrieval request of the set of work processor retrieval requests corresponds to a specific work item type.

In some cases, the data object store may be associated with a metadata database. In these cases, metadata component 750 may identify a tenant identifier, a user identifier, or a combination thereof corresponding to the set of data retention requests. Metadata component 750 may determine the one or more datasets according to metadata in the metadata database associated with the tenant identifier, the user identifier, or the combination thereof. In some cases, the set of data retention requests correspond to deprovisioning a tenant of the data object store corresponding to the tenant identifier or record deletion for a user of the tenant of the data object store corresponding to the user identifier.

Marking component 755 may mark the generated consolidated work objects as unprocessed work objects. In some cases, marking component 755 may receive, from the work processor, an indication that the work processor processed the generated consolidated work objects, and may mark the generated consolidated work objects as processed work objects based on the indication received from the work processor.

In some cases, evaluating the set of data retention requests to determine the set of active data retention requests associated with the one or more active actions involves timing component 760. For example, timing component 760 may identify expiration timestamps, TTL values, sequential TTL values, or a combination thereof for the set of data retention requests, may compare a current timestamp to the identified expiration timestamps, TTL values, sequential TTL values, or the combination thereof, and may determine the one or more active actions based on the comparing. In some cases, the work processor removes a set of data objects, a set of data object records, or a combination thereof from the dataset for each consolidated work object based on the aggregate action and the current timestamp exceeding the identified expiration timestamps, TTL values, sequential TTL values, or the combination thereof.

Extraction component 765 may receive, from the work processor, a set of data objects, data object records, or combination thereof corresponding to the aggregate action, and may extract the set of data objects, data object records, or combination thereof. Exportation component 770 may export, to a user device, a link to access the extracted set of data objects, data object records, or combination thereof.

Figure 8:
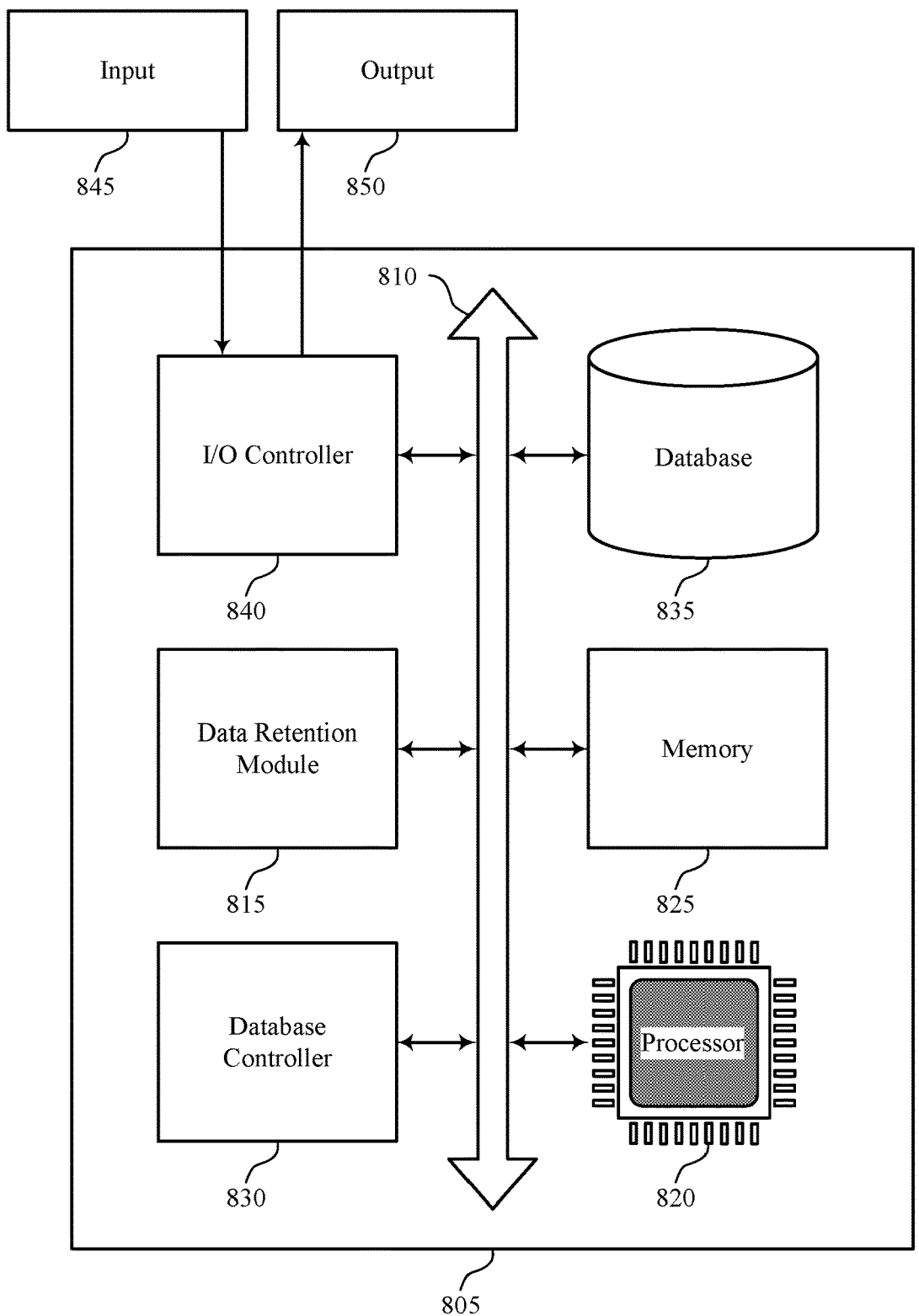
FIG. 8 illustrates a block diagram of a system including a data store that supports data retention handling for data object stores in accordance with aspects of the present disclosure.

FIG. 8 shows a diagram of a system 800 including a device 805 that supports data retention handling for data object stores in accordance with aspects of the present disclosure. Device 805 may be an example of or include the components of a data store, a relational data store, or a data object store as described herein, for example, with reference to FIGS. 1 through 5. Device 805 may include components for bi-directional data communications including components for transmitting and receiving communications, including data retention module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting data retention handling for data object stores).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
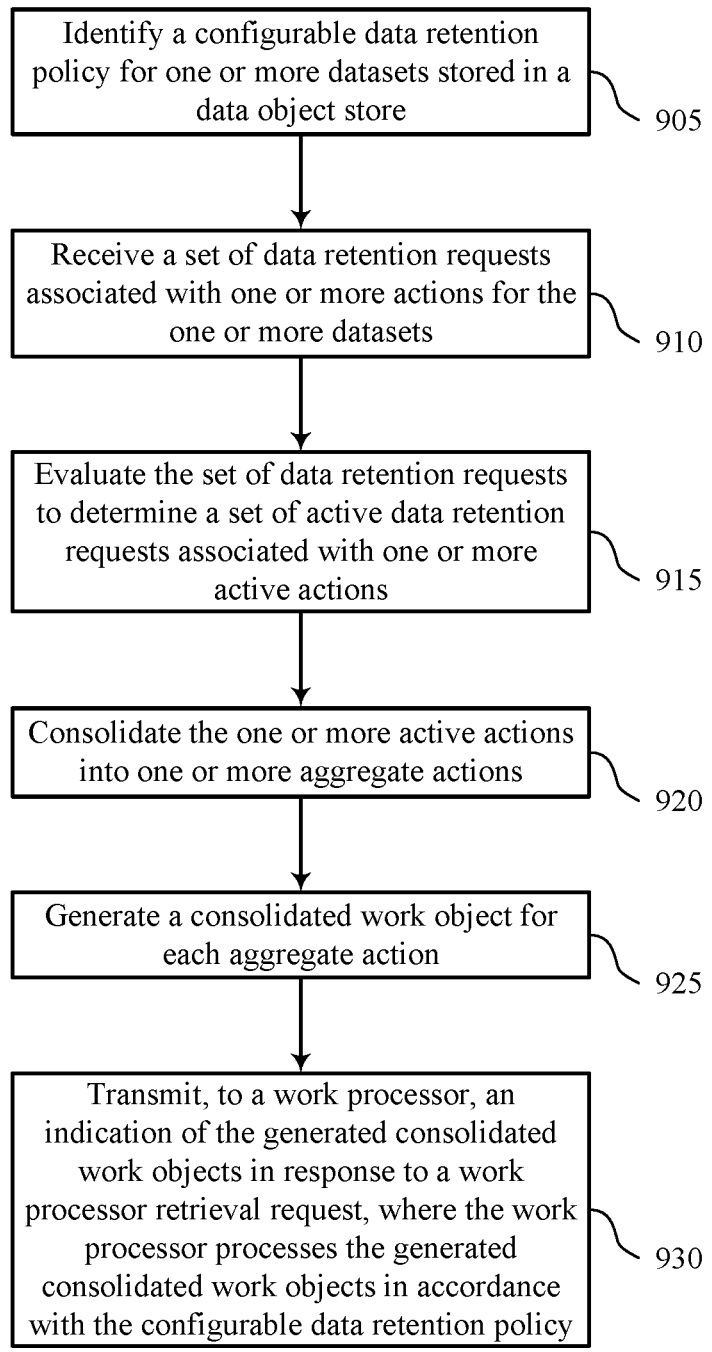
FIGS. 9 through 12 illustrate methods for data retention handling for data object stores in accordance with aspects of the present disclosure.

FIG. 9 shows a flowchart illustrating a method 900 for data retention handling for data object stores in accordance with aspects of the present disclosure. The operations of method 900 may be implemented by a data store or its components as described herein. For example, the operations of method 900 may be performed by a data retention module as described with reference to FIGS. 6 through 8. In some examples, a data store may execute a set of codes to control the functional elements of the device to perform the functions described below. Additionally or alternatively, the data store may perform aspects of the functions described below using special-purpose hardware.

At 905 the data store may identify a configurable data retention policy for one or more datasets stored in the data object store. The operations of 905 may be performed according to the methods described herein. In certain examples, aspects of the operations of 905 may be performed by a data retention policy component as described with reference to FIGS. 6 through 8.

At 910 the data store may receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The operations of 910 may be performed according to the methods described herein. In certain examples, aspects of the operations of 910 may be performed by a retention request reception component as described with reference to FIGS. 6 through 8.

At 915 the data store may evaluate the plurality of data retention requests to determine a set of active data retention requests associated with one or more active actions. The operations of 915 may be performed according to the methods described herein. In certain examples, aspects of the operations of 915 may be performed by an evaluation component as described with reference to FIGS. 6 through 8.

At 920 the data store may consolidate the one or more active actions into one or more aggregate actions, wherein each aggregate action corresponds to one or more active data retention requests of the set of active data retention requests to perform on a dataset. The operations of 920 may be performed according to the methods described herein. In certain examples, aspects of the operations of 920 may be performed by a consolidation component as described with reference to FIGS. 6 through 8.

At 925 the data store may generate a consolidated work object for each aggregate action, wherein each consolidated work object comprises a work item type corresponding to the aggregate action and a dataset identifier corresponding to the dataset. The operations of 925 may be performed according to the methods described herein. In certain examples, aspects of the operations of 925 may be performed by a work object generator as described with reference to FIGS. 6 through 8.

At 930 the data store may transmit, to a work processor, an indication of the generated consolidated work objects in response to a work processor retrieval request. The work processor may process the generated consolidated work objects in accordance with the configurable data retention policy. The operations of 930 may be performed according to the methods described herein. In certain examples, aspects of the operations of 930 may be performed by a work processing component as described with reference to FIGS. 6 through 8.

Figure 10:
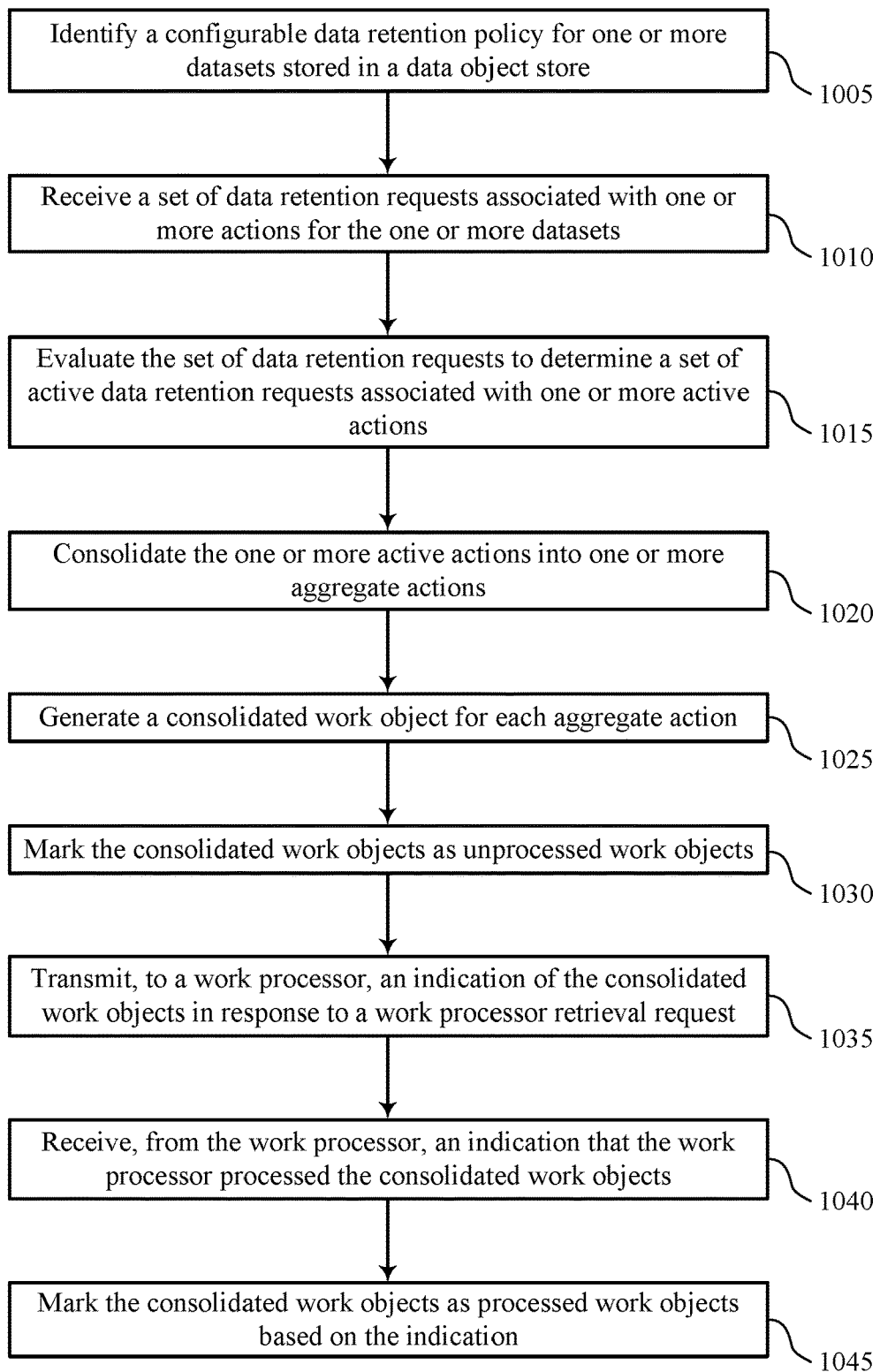

FIG. 10 shows a flowchart illustrating a method 1000 for data retention handling for data object stores in accordance with aspects of the present disclosure. The operations of method 1000 may be implemented by a data store or its components as described herein. For example, the operations of method 1000 may be performed by a data retention module as described with reference to FIGS. 6 through 8. In some examples, a data store may execute a set of codes to control the functional elements of the device to perform the functions described below. Additionally or alternatively, the data store may perform aspects of the functions described below using special-purpose hardware.

At 1005 the data store may identify a configurable data retention policy for one or more datasets stored in the data object store. The operations of 1005 may be performed according to the methods described herein. In certain examples, aspects of the operations of 1005 may be performed by a data retention policy component as described with reference to FIGS. 6 through 8.

At 1010 the data store may receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The operations of 1010 may be performed according to the methods described herein. In certain examples, aspects of the operations of 1010 may be performed by a retention request reception component as described with reference to FIGS. 6 through 8.

At 1015 the data store may evaluate the plurality of data retention requests to determine a set of active data retention requests associated with one or more active actions. The operations of 1015 may be performed according to the methods described herein. In certain examples, aspects of the operations of 1015 may be performed by an evaluation component as described with reference to FIGS. 6 through 8.

At 1020 the data store may consolidate the one or more active actions into one or more aggregate actions, wherein each aggregate action corresponds to one or more active data retention requests of the set of active data retention requests to perform on a dataset. The operations of 1020 may be performed according to the methods described herein. In certain examples, aspects of the operations of 1020 may be performed by a consolidation component as described with reference to FIGS. 6 through 8.

At 1025 the data store may generate a consolidated work object for each aggregate action, wherein each consolidated work object comprises a work item type corresponding to the aggregate action and a dataset identifier corresponding to the dataset. The operations of 1025 may be performed according to the methods described herein. In certain examples, aspects of the operations of 1025 may be performed by a work object generator as described with reference to FIGS. 6 through 8.

At 1030 the data store may mark the generated consolidated work objects as unprocessed work objects. The operations of 1030 may be performed according to the methods described herein. In certain examples, aspects of the operations of 1030 may be performed by a marking component as described with reference to FIGS. 6 through 8.

At 1035 the data store may transmit, to a work processor, an indication of the generated consolidated work objects in response to a work processor retrieval request, wherein the work processor may process the generated consolidated work objects in accordance with the configurable data retention policy. The operations of 1035 may be performed according to the methods described herein. In certain examples, aspects of the operations of 1035 may be performed by a work processing component as described with reference to FIGS. 6 through 8.

At 1040 the data store may receive, from the work processor, an indication that the work processor processed the generated consolidated work objects. The operations of 1040 may be performed according to the methods described herein. In certain examples, aspects of the operations of 1040 may be performed by a marking component as described with reference to FIGS. 6 through 8.

At 1045 the data store may mark the generated consolidated work objects as processed work objects based at least in part on the indication received from the work processor. The operations of 1045 may be performed according to the methods described herein. In certain examples, aspects of the operations of 1045 may be performed by a marking component as described with reference to FIGS. 6 through 8.

Figure 11:
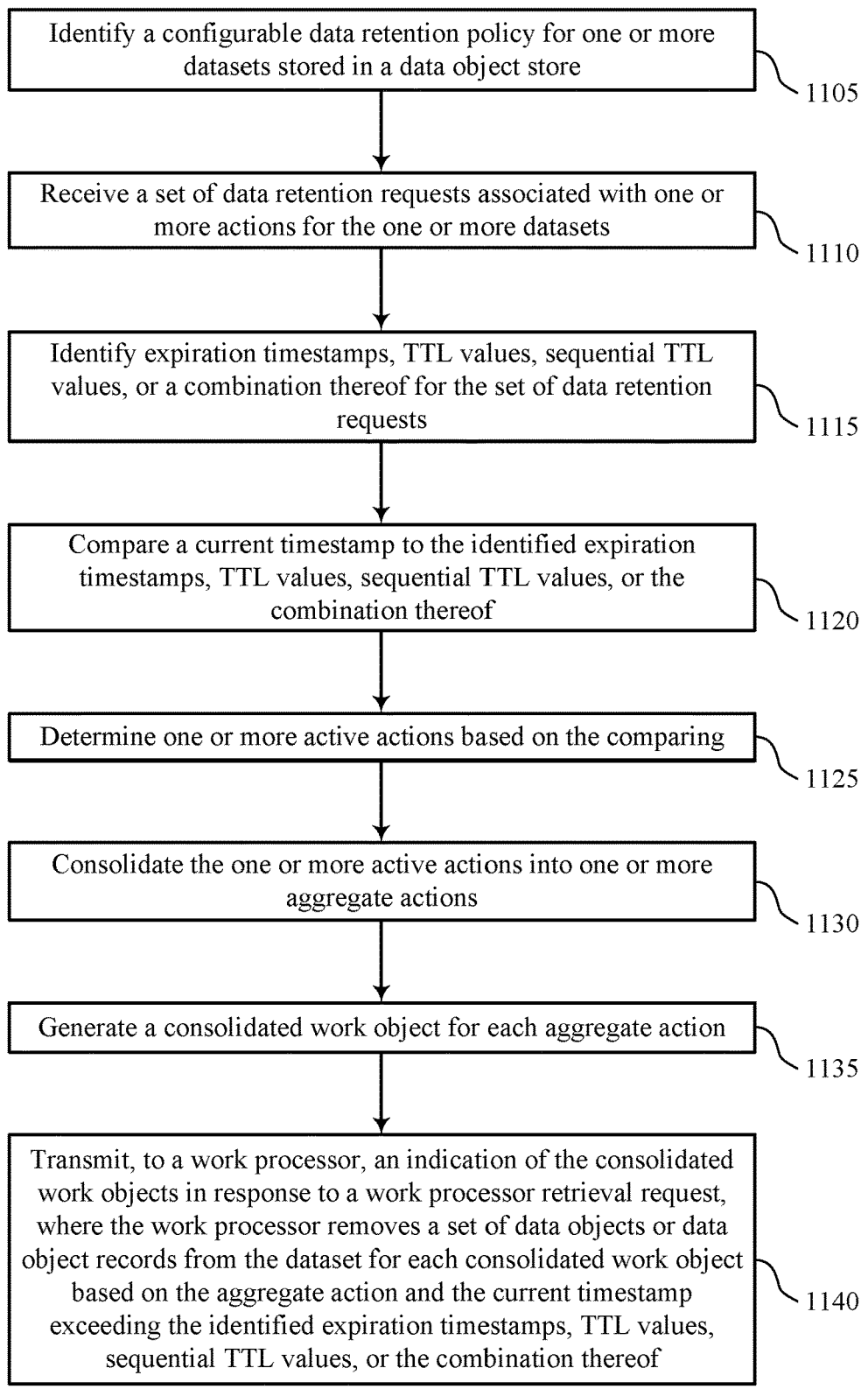

FIG. 11 shows a flowchart illustrating a method 1100 for data retention handling for data object stores in accordance with aspects of the present disclosure. The operations of method 1100 may be implemented by a data store or its components as described herein. For example, the operations of method 1100 may be performed by a data retention module as described with reference to FIGS. 6 through 8. In some examples, a data store may execute a set of codes to control the functional elements of the device to perform the functions described below. Additionally or alternatively, the data store may perform aspects of the functions described below using special-purpose hardware.

At 1105 the data store may identify a configurable data retention policy for one or more datasets stored in the data object store. The operations of 1105 may be performed according to the methods described herein. In certain examples, aspects of the operations of 1105 may be performed by a data retention policy component as described with reference to FIGS. 6 through 8.

At 1110 the data store may receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The operations of 1110 may be performed according to the methods described herein. In certain examples, aspects of the operations of 1110 may be performed by a retention request reception component as described with reference to FIGS. 6 through 8.

The data store may evaluate the plurality of data retention requests to determine a set of active data retention requests associated with one or more active actions. For example, at 1115 the data store may identify expiration timestamps, TTL values, sequential TTL values, or a combination thereof for the plurality of data retention requests. The operations of 1115 may be performed according to the methods described herein. In certain examples, aspects of the operations of 1115 may be performed by a timing component as described with reference to FIGS. 6 through 8.

At 1120 the data store may compare a current timestamp to the identified expiration timestamps, TTL values, sequential TTL values, or the combination thereof. The operations of 1120 may be performed according to the methods described herein. In certain examples, aspects of the operations of 1120 may be performed by a timing component as described with reference to FIGS. 6 through 8.

At 1125 the data store may determine the one or more active actions based at least in part on the comparing. The operations of 1125 may be performed according to the methods described herein. In certain examples, aspects of the operations of 1125 may be performed by a timing component as described with reference to FIGS. 6 through 8.

At 1130 the data store may consolidate the one or more active actions into one or more aggregate actions, wherein each aggregate action corresponds to one or more active data retention requests of the set of active data retention requests to perform on a dataset. The operations of 1130 may be performed according to the methods described herein. In certain examples, aspects of the operations of 1130 may be performed by a consolidation component as described with reference to FIGS. 6 through 8.

At 1135 the data store may generate a consolidated work object for each aggregate action, wherein each consolidated work object comprises a work item type corresponding to the aggregate action and a dataset identifier corresponding to the dataset. The operations of 1135 may be performed according to the methods described herein. In certain examples, aspects of the operations of 1135 may be performed by a work object generator as described with reference to FIGS. 6 through 8.

At 1140 the data store may transmit, to a work processor, an indication of the generated consolidated work objects in response to a work processor retrieval request. The work processor may remove a set of data objects, a set of data object records, or a combination thereof from the dataset for each consolidated work object based at least in part on the aggregate action and the current timestamp exceeding the identified expiration timestamps, TTL values, sequential TTL values, or the combination thereof. The operations of 1140 may be performed according to the methods described herein. In certain examples, aspects of the operations of 1140 may be performed by a work processing component as described with reference to FIGS. 6 through 8.

Figure 12:
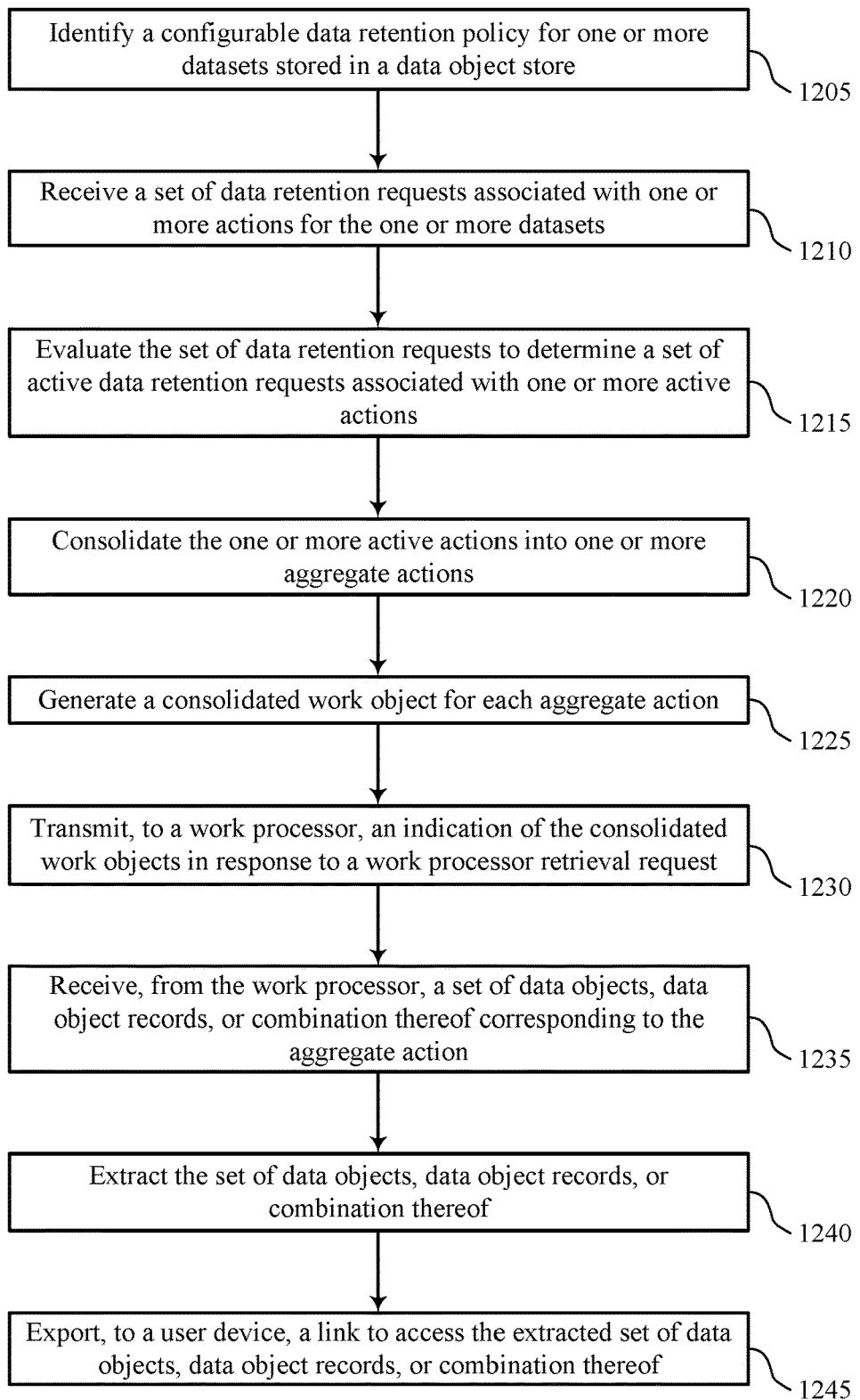

FIG. 12 shows a flowchart illustrating a method 1200 for data retention handling for data object stores in accordance with aspects of the present disclosure. The operations of method 1200 may be implemented by a data store or its components as described herein. For example, the operations of method 1200 may be performed by a data retention module as described with reference to FIGS. 6 through 8. In some examples, a data store may execute a set of codes to control the functional elements of the device to perform the functions described below. Additionally or alternatively, the data store may perform aspects of the functions described below using special-purpose hardware.

At 1205 the data store may identify a configurable data retention policy for one or more datasets stored in the data object store. The operations of 1205 may be performed according to the methods described herein. In certain examples, aspects of the operations of 1205 may be performed by a data retention policy component as described with reference to FIGS. 6 through 8.

At 1210 the data store may receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The operations of 1210 may be performed according to the methods described herein. In certain examples, aspects of the operations of 1210 may be performed by a retention request reception component as described with reference to FIGS. 6 through 8.

At 1215 the data store may evaluate the plurality of data retention requests to determine a set of active data retention requests associated with one or more active actions. The operations of 1215 may be performed according to the methods described herein. In certain examples, aspects of the operations of 1215 may be performed by an evaluation component as described with reference to FIGS. 6 through 8.

At 1220 the data store may consolidate the one or more active actions into one or more aggregate actions, wherein each aggregate action corresponds to one or more active data retention requests of the set of active data retention requests to perform on a dataset. The operations of 1220 may be performed according to the methods described herein. In certain examples, aspects of the operations of 1220 may be performed by a consolidation component as described with reference to FIGS. 6 through 8.

At 1225 the data store may generate a consolidated work object for each aggregate action, wherein each consolidated work object comprises a work item type corresponding to the aggregate action and a dataset identifier corresponding to the dataset. The operations of 1225 may be performed according to the methods described herein. In certain examples, aspects of the operations of 1225 may be performed by a work object generator as described with reference to FIGS. 6 through 8.

At 1230 the data store may transmit, to a work processor, an indication of the generated consolidated work objects in response to a work processor retrieval request, wherein the work processor processes the generated consolidated work objects in accordance with the configurable data retention policy. The operations of 1230 may be performed according to the methods described herein. In certain examples, aspects of the operations of 1230 may be performed by a work processing component as described with reference to FIGS. 6 through 8.

At 1235 the data store may receive, from the work processor, a set of data objects, data object records, or combination thereof corresponding to the aggregate action. The operations of 1235 may be performed according to the methods described herein. In certain examples, aspects of the operations of 1235 may be performed by an extraction component as described with reference to FIGS. 6 through 8.

At 1240 the data store may extract the set of data objects, data object records, or combination thereof. The operations of 1240 may be performed according to the methods described herein. In certain examples, aspects of the operations of 1240 may be performed by an extraction component as described with reference to FIGS. 6 through 8.

At 1245 the data store may export, to a user device, a link to access the extracted set of data objects, data object records, or combination thereof. The operations of 1245 may be performed according to the methods described herein. In certain examples, aspects of the operations of 1245 may be performed by an exportation component as described with reference to FIGS. 6 through 8.

A method of data processing at a data object store is described. The method may include identifying a configurable data retention policy for one or more datasets stored in the data object store, and receiving a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The method may further include evaluating the plurality of data retention requests to determine a set of active data retention requests associated with one or more active actions, consolidating the one or more active actions into one or more aggregate actions, wherein each aggregate action corresponds to one or more active data retention requests of the set of active data retention requests to perform on a dataset, and generating a consolidated work object for each aggregate action, wherein each consolidated work object comprises a work item type corresponding to the aggregate action and a dataset identifier corresponding to the dataset. Additionally, the method may include transmitting, to a work processor, an indication of the generated consolidated work objects in response to a work processor retrieval request, wherein the work processor processes the generated consolidated work objects in accordance with the configurable data retention policy.

An apparatus for data processing at a data object store is described. The apparatus may include a processor, memory in electronic communication with the processor, and instructions stored in the memory. The instructions may be operable to cause the processor to identify a configurable data retention policy for one or more datasets stored in the data object store, and receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The instructions may be further operable to cause the processor to evaluate the plurality of data retention requests to determine a set of active data retention requests associated with one or more active actions, consolidate the one or more active actions into one or more aggregate actions, wherein each aggregate action corresponds to one or more active data retention requests of the set of active data retention requests to perform on a dataset, and generate a consolidated work object for each aggregate action, wherein each consolidated work object comprises a work item type corresponding to the aggregate action and a dataset identifier corresponding to the dataset. Additionally, the instructions may be operable to cause the processor to transmit, to a work processor, an indication of the generated consolidated work objects in response to a work processor retrieval request, wherein the work processor processes the generated consolidated work objects in accordance with the configurable data retention policy.

A non-transitory computer-readable medium for data processing at a data object store is described. The non-transitory computer-readable medium may include instructions operable to cause a processor to identify a configurable data retention policy for one or more datasets stored in the data object store, and receive a plurality of data retention requests associated with one or more actions for the one or more datasets, wherein each data retention request corresponds to an action to perform on at least one dataset of the one or more datasets stored in the data object store, and wherein the one or more actions correspond to exporting or deleting data objects, data object records, or a combination thereof according to the configurable data retention policy. The instructions may be further operable to cause the processor to evaluate the plurality of data retention requests to determine a set of active data retention requests associated with one or more active actions, consolidate the one or more active actions into one or more aggregate actions, wherein each aggregate action corresponds to one or more active data retention requests of the set of active data retention requests to perform on a dataset, and generate a consolidated work object for each aggregate action, wherein each consolidated work object comprises a work item type corresponding to the aggregate action and a dataset identifier corresponding to the dataset. Additionally, the instructions may be operable to cause the processor to transmit, to a work processor, an indication of the generated consolidated work objects in response to a work processor retrieval request, wherein the work processor processes the generated consolidated work objects in accordance with the configurable data retention policy.

In some examples of the method, apparatus, and non-transitory computer-readable medium described above, the data object store may be associated with a metadata database. The method, apparatus, or non-transitory computer-readable medium described above may further include processes, features, means, or instructions for identifying a tenant identifier, a user identifier, or a combination thereof corresponding to the plurality of data retention requests. Some examples of the method, apparatus, and non-transitory computer-readable medium described above may further include processes, features, means, or instructions for determining the one or more datasets according to metadata in the metadata database associated with the tenant identifier, the user identifier, or the combination thereof.

In some examples of the method, apparatus, and non-transitory computer-readable medium described above, the plurality of data retention requests correspond to deprovisioning a tenant of the data object store corresponding to the tenant identifier or record deletion for a user of the tenant of the data object store corresponding to the user identifier.

Some examples of the method, apparatus, and non-transitory computer-readable medium described above may further include processes, features, means, or instructions for receiving, from a user device, the configurable data retention policy, wherein the configurable data retention policy may be for a tenant or a user corresponding to the one or more datasets. In some examples of the method, apparatus, and non-transitory computer-readable medium described above, the configurable data retention policy overrides one or more global data retention policies for the data object store.

Some examples of the method, apparatus, and non-transitory computer-readable medium described above may further include processes, features, means, or instructions for marking the generated consolidated work objects as unprocessed work objects. Some examples of the method, apparatus, and non-transitory computer-readable medium described above may further include processes, features, means, or instructions for receiving, from the work processor, an indication that the work processor processed the generated consolidated work objects. Some examples of the method, apparatus, and non-transitory computer-readable medium described above may further include processes, features, means, or instructions for marking the generated consolidated work objects as processed work objects based at least in part on the indication received from the work processor.

In some examples of the method, apparatus, and non-transitory computer-readable medium described above, evaluating the plurality of data retention requests to determine the set of active data retention requests associated with the one or more active actions may comprise identifying expiration timestamps, TTL values, sequential TTL values, or a combination thereof for the plurality of data retention requests. Some examples of the method, apparatus, and non-transitory computer-readable medium described above may further include processes, features, means, or instructions for comparing a current timestamp to the identified expiration timestamps, TTL values, sequential TTL values, or the combination thereof. Some examples of the method, apparatus, and non-transitory computer-readable medium described above may further include processes, features, means, or instructions for determining the one or more active actions based at least in part on the comparing.

In some examples of the method, apparatus, and non-transitory computer-readable medium described above, the work processor may remove a set of data objects, a set of data object records, or a combination thereof from the dataset for each consolidated work object based at least in part on the aggregate action and the current timestamp exceeding the identified expiration timestamps, TTL values, sequential TTL values, or the combination thereof.

Some examples of the method, apparatus, and non-transitory computer-readable medium described above may further include processes, features, means, or instructions for receiving, from the work processor, a set of data objects, data object records, or combination thereof corresponding to the aggregate action. Some examples of the method, apparatus, and non-transitory computer-readable medium described above may further include processes, features, means, or instructions for extracting the set of data objects, data object records, or combination thereof. Some examples of the method, apparatus, and non-transitory computer-readable medium described above may further include processes, features, means, or instructions for exporting, to a user device, a link to access the extracted set of data objects, data object records, or combination thereof.

In some examples of the method, apparatus, and non-transitory computer-readable medium described above, receiving the plurality of data retention requests comprises periodically retrieving batches of data retention requests.

Some examples of the method, apparatus, and non-transitory computer-readable medium described above may further include processes, features, means, or instructions for receiving a plurality of work processor retrieval requests according to a work processor periodicity, wherein each work processor retrieval request of the plurality of work processor retrieval requests corresponds to a specific work item type.

In some examples of the method, apparatus, and non-transitory computer-readable medium described above, the plurality of data retention requests may be evaluated according to a dynamic or pre-determined periodicity. In some examples of the method, apparatus, and non-transitory computer-readable medium described above, the one or more datasets comprise data formatted in a non-relational database schema.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a data object store, comprising:
    identifying a configurable data retention policy for one or more datasets stored in the data object store;
    receiving a plurality of data retention requests associated with one or more actions for the one or more datasets, wherein each data retention request corresponds to an action to perform on at least one dataset, and wherein the one or more actions correspond to exporting or deleting data objects, data object records, or a combination thereof according to the configurable data retention policy;
    evaluating the plurality of data retention requests to determine a tenant identifier indicating a dataset and a plurality active actions due to be performed on the dataset, wherein the plurality of active actions correspond to deprovisioning a tenant of the data object store corresponding to the tenant identifier;
    consolidating the plurality of active actions into a first aggregate action and a second aggregate action, wherein the first aggregate action comprises a first set of active actions and the second aggregate action comprises a second set of active actions, wherein the first set of active actions correspond to a first action type to perform on the dataset and the second set of active actions correspond to a second action type to perform on the dataset;
    generating a first consolidated work object for the first aggregate action and a second consolidated work object for the second aggregate action, wherein the first consolidated work object comprises a first work item type corresponding to the first action type, a second work item type corresponding to the second action type and a dataset identifier corresponding to the dataset;
    marking the first consolidated work object and the second consolidated work object as unprocessed work objects, wherein the first consolidated work object is processed using a first work processor procedure and the second consolidated work object is processed using a second work processor procedure; and
    transmitting an indication of the first consolidated work object and the second consolidated work object in response to a work processor retrieval request.

2. The method of claim 1, wherein the data object store is associated with a metadata database, the method further comprising:
    identifying a user identifier corresponding to the plurality of data retention requests; and
    determining the one or more datasets according to metadata in the metadata database associated with the tenant identifier, the user identifier, or the combination thereof.

3. The method of claim 2, wherein the plurality of data retention requests correspond to record deletion for a user of the tenant of the data object store corresponding to the user identifier.

4. The method of claim 1, further comprising:
    receiving, from a user device, the configurable data retention policy, wherein the configurable data retention policy is for the tenant or a user corresponding to the one or more datasets.

5. The method of claim 4, wherein the configurable data retention policy overrides one or more global data retention policies for the data object store.

6. The method of claim 1, further comprising:
    receiving, from the work processor, an indication that the work processor processed the first consolidated work object and the second consolidated work object; and
    marking the first consolidated work object and the second consolidated work object as processed work objects based at least in part on the indication received from the work processor.

7. The method of claim 1, wherein evaluating the plurality of data retention requests to determine the set of active data retention requests associated with the plurality of active actions comprises:
    identifying expiration timestamps, time-to-live (TTL) values, sequential TTL values, or a combination thereof for the plurality of data retention requests;
    comparing a current timestamp to the identified expiration timestamps, TTL values, sequential TTL values, or the combination thereof; and determining the plurality of active actions based at least in part on the comparing.

8. The method of claim 7, wherein the work processor removes a set of data objects, a set of data object records, or a combination thereof from the dataset for each consolidated work object based at least in part on the first aggregate action and the current timestamp exceeding the identified expiration timestamps, TTL values, sequential TTL values, or the combination thereof.

9. The method of claim 1, further comprising:
receiving, from the work processor, a set of data objects, data object records, or combination thereof corresponding to the first aggregate action;
extracting the set of data objects, data object records, or combination thereof; and
exporting, to a user device, a link to access the extracted set of data objects, data object records, or combination thereof.

10. The method of claim 1, wherein receiving the plurality of data retention requests comprises:
periodically retrieving batches of data retention requests.

11. The method of claim 1, further comprising:
receiving a plurality of work processor retrieval requests according to a work processor periodicity, wherein each work processor retrieval request of the plurality of work processor retrieval requests corresponds to a specific work item type.

12. The method of claim 1, wherein the plurality of data retention requests are evaluated according to a dynamic or pre-determined periodicity.

13. The method of claim 1, wherein the one or more datasets comprise data formatted in a non-relational database schema.

14. An apparatus for data processing at a data object store, comprising: a processor; memory in electronic communication with the processor; and
instructions stored in the memory and executable by the processor to cause the apparatus to:
identify a configurable data retention policy for one or more datasets stored in the data object store;
receive a plurality of data retention requests associated with one or more actions for the one or more datasets, wherein each data retention request corresponds to an action to perform on at least one dataset, and wherein the one or more actions correspond to exporting or deleting data objects, data object records, or a combination thereof according to the configurable data retention policy;
evaluate the plurality of data retention requests to determine a tenant identifier indicating a dataset and a plurality active actions due to be performed on the dataset, wherein the plurality of active actions correspond to deprovisioning a tenant of the data object store corresponding to the tenant identifier;
consolidate the plurality of active actions into a first aggregate action and a second aggregate action, wherein the first aggregate action comprises a first set of active actions and the second aggregate action comprises a second set of active actions, wherein the first set of active actions correspond to a first action type to perform on the dataset and the second set of active actions correspond to a second action type to perform on the dataset;
generate a first consolidated work object for the first aggregate action and a second consolidated work object for the second aggregate action, wherein the first consolidated work object comprises a first work item type corresponding to the first action type, a second work item type corresponding to the second action type and a dataset identifier corresponding to the dataset;
mark the first consolidated work object and the second consolidated work object as unprocessed work objects, wherein the first consolidated work object is processed using a first work processor procedure and the second consolidated work object is processed using a second work processor procedure; and
transmit an indication of the first consolidated work object and the second consolidated work object in response to a work processor retrieval request.

15. The apparatus of claim 14, wherein the data object store is associated with a metadata database, the instructions further executable by the processor to cause the apparatus to:
identify a user identifier corresponding to the plurality of data retention requests; and
determine the one or more datasets according to metadata in the metadata database associated with the tenant identifier, the user identifier, or the combination thereof.

16. The apparatus of claim 14, wherein the instructions are further executable by the processor to cause the apparatus to:
receive, from a user device, the configurable data retention policy, wherein the configurable data retention policy is for the tenant or a user corresponding to the one or more datasets.

17. The apparatus of claim 14, wherein the instructions are further executable by the processor to cause the apparatus to:
receive, from the work processor, an indication that the work processor processed the first consolidated work object and the second consolidated work object; and
mark the first consolidated work object and the second consolidated work object as processed work objects based at least in part on the indication received from the work processor.

18. The apparatus of claim 14, wherein the instructions to evaluate the plurality of data retention requests to determine the set of active data retention requests associated with the plurality of active actions are executable by the processor to cause the apparatus to:
identify expiration timestamps, time-to-live (TTL) values, sequential TTL values, or a combination thereof for the plurality of data retention requests;
compare a current timestamp to the identified expiration timestamps, TTL values, sequential TTL values, or the combination thereof; and
determine the plurality of active actions based at least in part on the comparing.

19. The apparatus of claim 14, wherein the instructions are further executable by the processor to cause the apparatus to:
receive, from the work processor, a set of data objects, data object records, or combination thereof corresponding to the first aggregate action;
extract the set of data objects, data object records, or combination thereof; and
export, to a user device, a link to access the extracted set of data objects, data object records, or combination thereof.

20. A non-transitory computer-readable medium storing code for data processing at a data object store, the code comprising instructions executable by a processor to:
identify a configurable data retention policy for one or more datasets stored in the data object store;

receive a plurality of data retention requests associated with one or more actions for the one or more datasets, wherein each data retention request corresponds to an action to perform on at least one dataset, and wherein the one or more actions correspond to exporting or deleting data objects, data object records, or a combination thereof according to the configurable data retention policy;

evaluate the plurality of data retention requests to determine a tenant identifier indicating a dataset and a plurality active actions due to be performed on the dataset, wherein the plurality of active actions correspond to deprovisioning a tenant of the data object store corresponding to the tenant identifier;

consolidate the plurality of active actions into a first aggregate action and a second aggregate action, wherein the first aggregate action comprises a first set of active actions and the second aggregate action comprises a second set of active actions, wherein the first set of active actions correspond to a first action type to perform on the dataset and the second set of active actions correspond to a second action type to perform on the dataset;

generate a first consolidated work object for the first aggregate action and a second consolidated work object for the second aggregate action, wherein the first consolidated work object comprises a first work item type corresponding to the first action type, a second work item type corresponding to the second action type and a dataset identifier corresponding to the dataset;

mark the first consolidated work object and the second consolidated work object as unprocessed work objects, wherein the first consolidated work object is processed using a first work processor procedure and the second consolidated work object is processed using a second work processor procedure; and transmit an indication of the first consolidated work object and the second consolidated work object in response to a work processor retrieval request.

* * * * *